(12) United States Patent
Santoro

(10) Patent No.: US 10,830,415 B2
(45) Date of Patent: Nov. 10, 2020

(54) LIGHT EMITTING PANEL ASSEMBLIES WITH BOTTOM-MOUNTED LIGHT SOURCE AND LIGHT GUIDES THEREFOR

(71) Applicant: Fluxwerx Illumination Inc., Surrey (CA)

(72) Inventor: Scott Santoro, Delta (CA)

(73) Assignee: Lumenpulse Group Inc./Group Lumenpulse Inc., Longueuil (CA)

( * ) Notice: Subject to any disclaimer, the term of this patent is extended or adjusted under 35 U.S.C. 154(b) by 31 days.

(21) Appl. No.: 15/571,020

(22) PCT Filed: May 11, 2016

(86) PCT No.: PCT/CA2016/050536
§ 371 (c)(1),
(2) Date: Oct. 31, 2017

(87) PCT Pub. No.: WO2016/179699
PCT Pub. Date: Nov. 17, 2016

(65) Prior Publication Data
US 2018/0163946 A1 Jun. 14, 2018

Related U.S. Application Data

(60) Provisional application No. 62/161,484, filed on May 14, 2015, provisional application No. 62/303,119, filed on Mar. 3, 2016.

(51) Int. Cl.
*F21K 9/61* (2016.01)
*F21V 7/00* (2006.01)
(Continued)

(52) U.S. Cl.
CPC .............. *F21V 7/0058* (2013.01); *F21K 9/61* (2016.08); *F21V 7/0016* (2013.01);
(Continued)

(58) Field of Classification Search
CPC ........ F21K 9/61; F21V 7/0016; F21V 7/0025; F21V 7/0058; G02B 6/10; G02B 6/0055; G02B 6/0068; G02B 6/009; G02B 6/0095
See application file for complete search history.

(56) References Cited

U.S. PATENT DOCUMENTS 6,932,499 B2 * 8/2005 Ogura .................... H04N 1/031
358/484
7,530,712 B2 * 5/2009 Lin ........................ F21V 7/0008
362/247
(Continued)

FOREIGN PATENT DOCUMENTS

CA 2702685 A1 11/2010
WO 2005/114045 A1 12/2005
(Continued)

*Primary Examiner* — Arman B Fallahkhair
(74) *Attorney, Agent, or Firm* — Oyen Wiggs Green & Mutala LLP

(57) ABSTRACT

A light emitting panel assembly is provided. The light emitting panel assembly includes: a housing; a light guide within the housing, the light guide having a first major surface with a plurality of extraction elements, a second major surface, a lower surface, an upper surface, a light source adjacent to the lower surface of the light guide; and an upper guide reflector having a diffuse reflective surface adjacent to and facing the upper surface of the light guide, whereby light from the light source traveling through the light guide toward the upper guide reflector spreads within the light guide, and whereby the upper guide reflector homogenizes the light before the light is redirected to the light guide. A luminaire comprising such a light emitting panel assembly is also provided.

23 Claims, 22 Drawing Sheets

(51) Int. Cl.
  *G02B 6/10* (2006.01)
  *F21Y 115/10* (2016.01)
  *F21V 8/00* (2006.01)

(52) U.S. Cl.
  CPC .............. *F21V 7/0025* (2013.01); *G02B 6/10* (2013.01); *F21Y 2115/10* (2016.08); *G02B 6/009* (2013.01); *G02B 6/0055* (2013.01); *G02B 6/0068* (2013.01); *G02B 6/0095* (2013.01)

(56) References Cited

U.S. PATENT DOCUMENTS

| | | | |
|---|---|---|---|
| 8,292,471 B2 | 10/2012 | Boonekamp | |
| 8,469,559 B2* | 6/2013 | Williams | G02B 6/0033 |
| | | | 362/296.05 |
| 8,702,292 B2* | 4/2014 | Catalano | F21V 17/002 |
| | | | 362/555 |
| 8,870,428 B2* | 10/2014 | Unger | F21K 9/61 |
| | | | 362/555 |
| 9,081,125 B2* | 7/2015 | Dau | F21V 7/0008 |
| 9,513,424 B2* | 12/2016 | Castillo | G02B 6/003 |
| 2002/0021563 A1 | 2/2002 | Ohsumi | |
| 2003/0137821 A1 | 7/2003 | Gotoh et al. | |
| 2005/0210643 A1* | 9/2005 | Mezei | G02B 6/001 |
| | | | 29/25 |
| 2006/0269213 A1 | 11/2006 | Hwang et al. | |
| 2012/0014134 A1 | 1/2012 | Fang et al. | |
| 2013/0107528 A1* | 5/2013 | Boyer | F21V 29/004 |
| | | | 362/243 |
| 2014/0140084 A1* | 5/2014 | Zwick | B60Q 1/26 |
| | | | 362/511 |
| 2014/0240828 A1 | 8/2014 | Robinson et al. | |

FOREIGN PATENT DOCUMENTS

| | | |
|---|---|---|
| WO | 2010/149583 A1 | 12/2010 |
| WO | 2012/075352 A1 | 6/2012 |
| WO | 2014/067009 A2 | 5/2014 |

\* cited by examiner

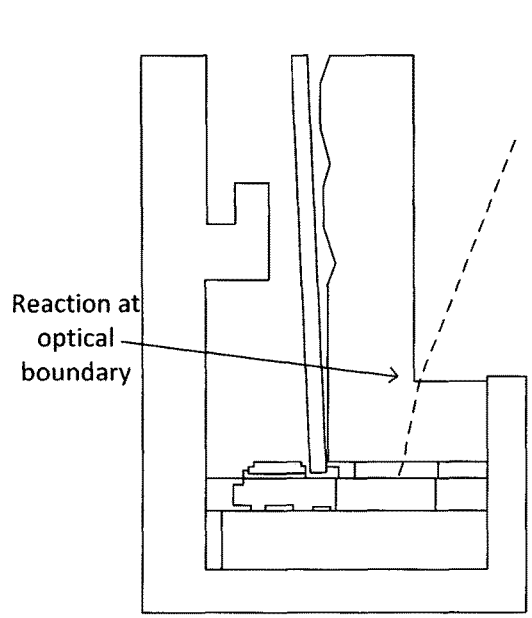
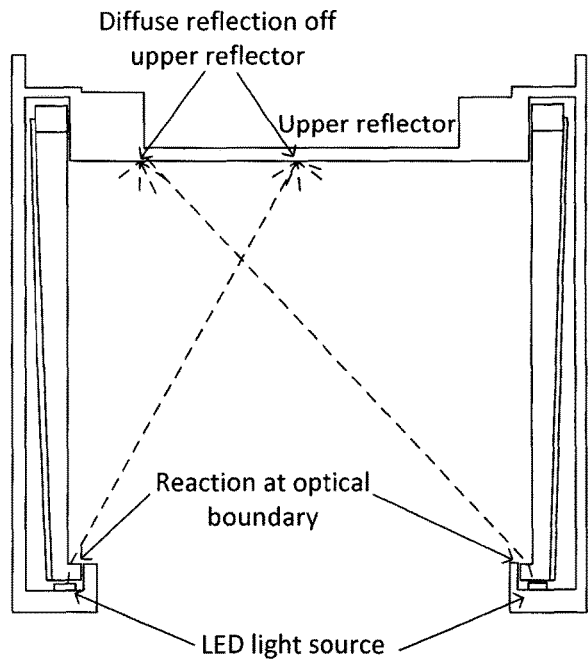
FIG. 7A
FIG. 7B
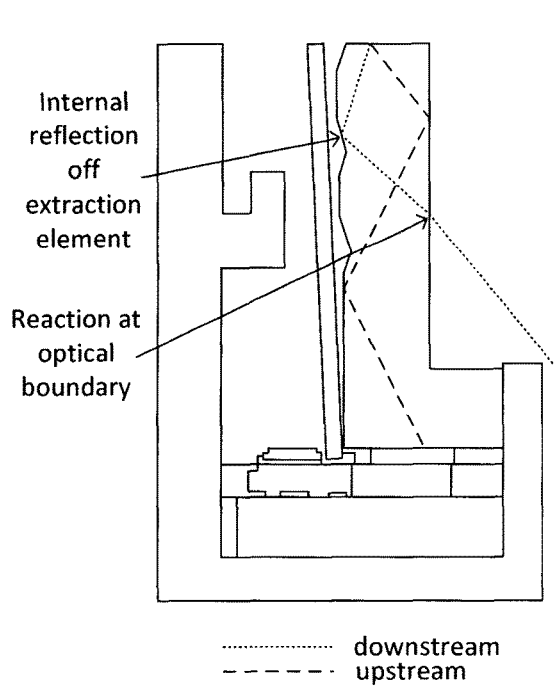
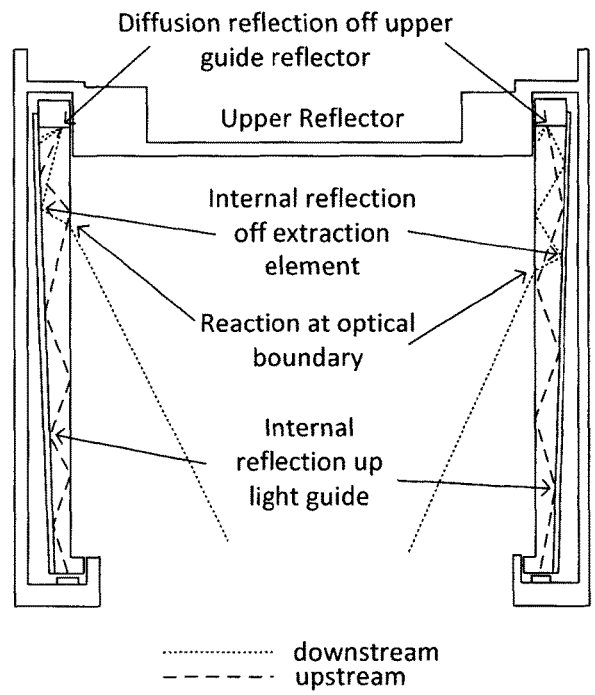
·········· downstream
- - - - - upstream
·········· downstream
- - - - - upstream
FIG. 8A
FIG. 8B

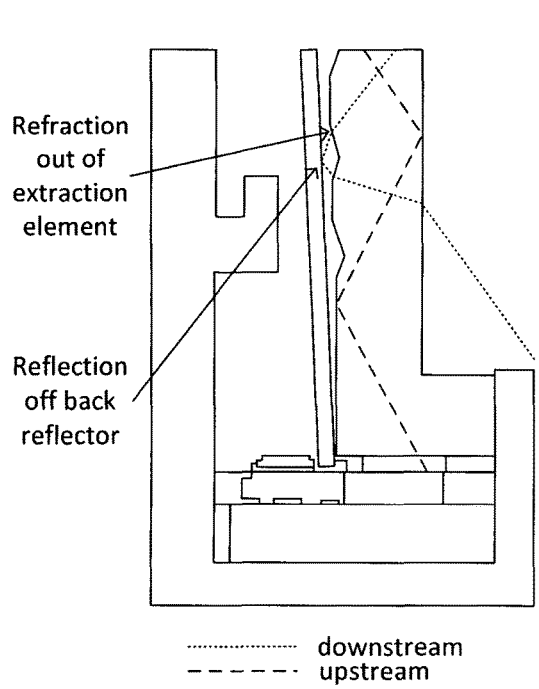
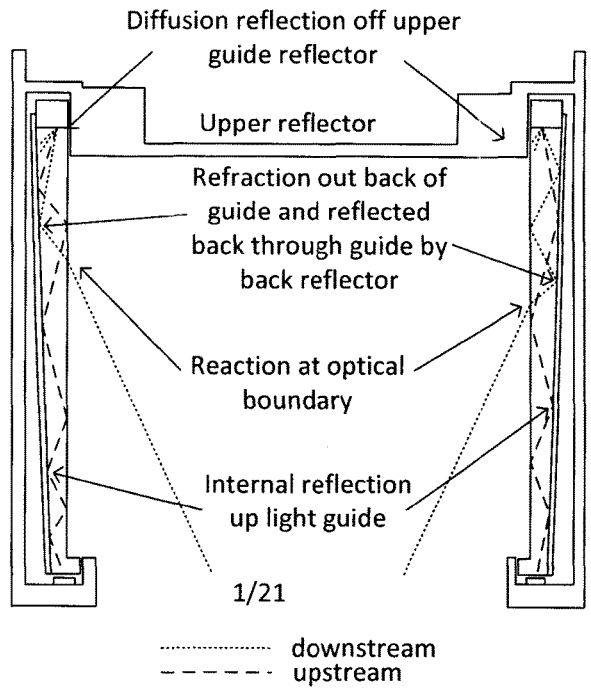
FIG. 9A
FIG. 9B
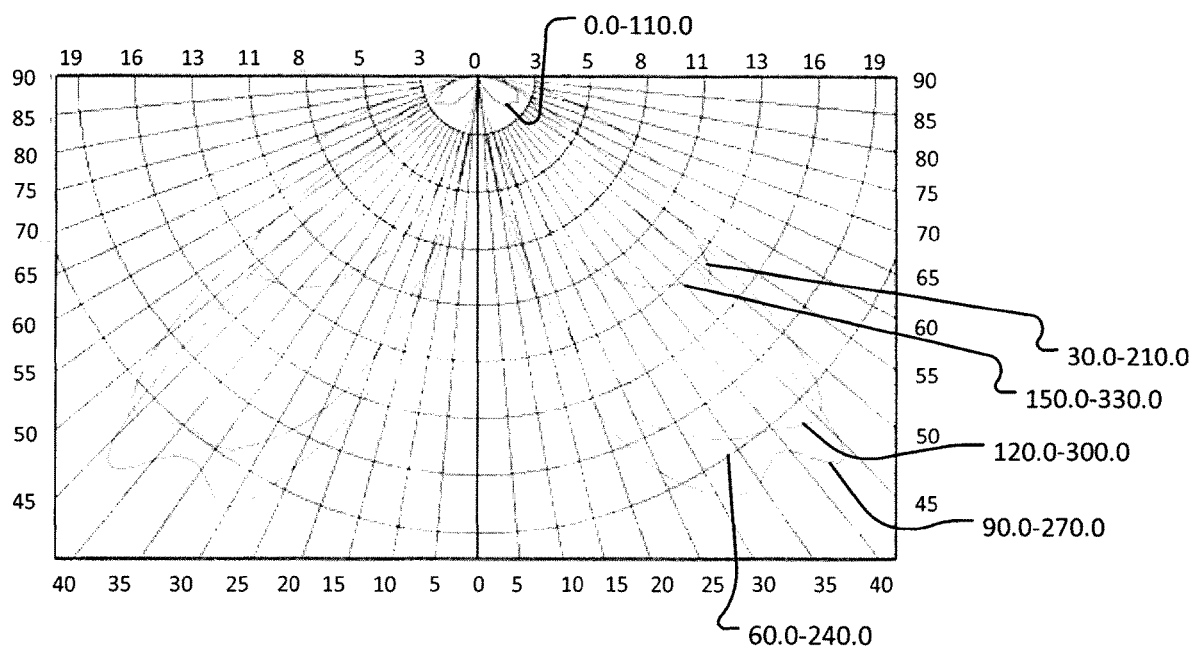
FIG. 10

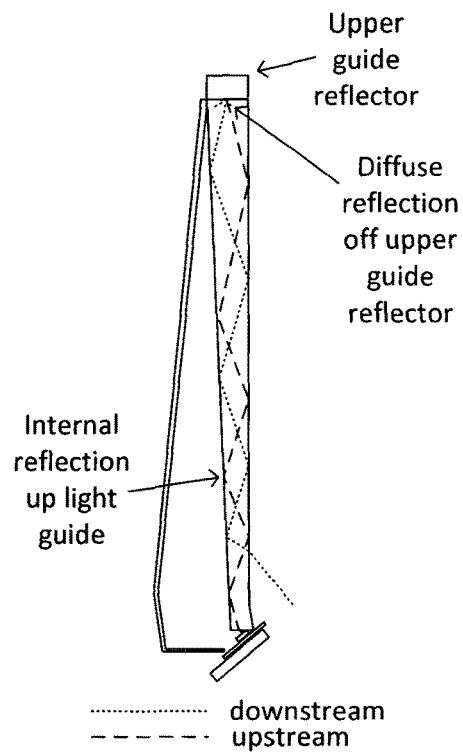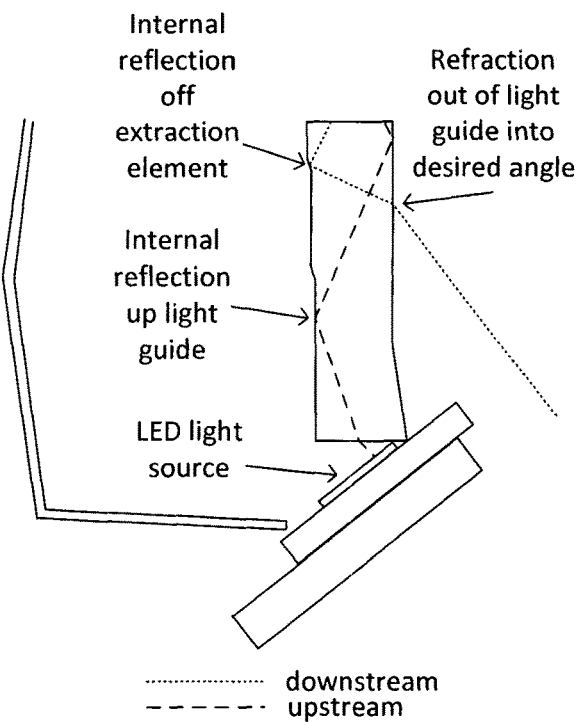
FIG. 19A
FIG. 19B
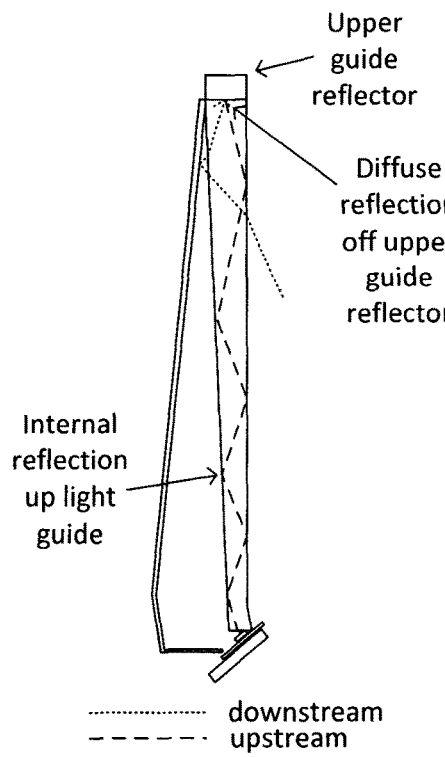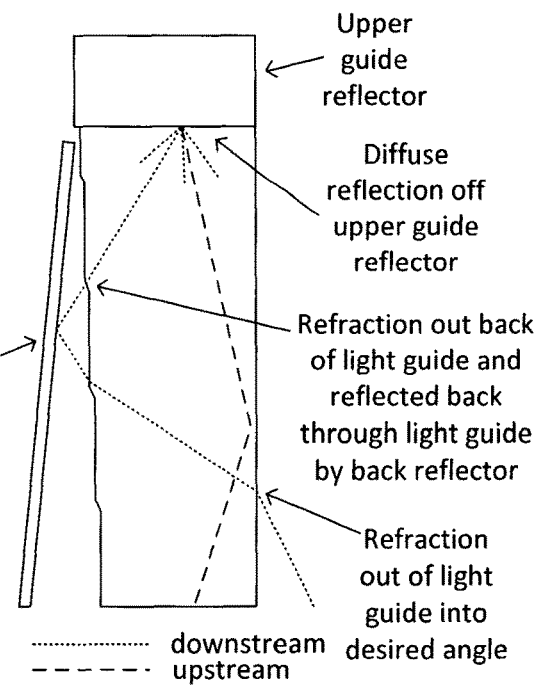
FIG. 20A
FIG. 20B

LIGHT EMITTING PANEL ASSEMBLIES WITH BOTTOM-MOUNTED LIGHT SOURCE AND LIGHT GUIDES THEREFOR

TECHNICAL FIELD

This invention relates to light emitting panel assemblies, and in particular light emitting panel assemblies with light guides. The light emitting panel assemblies may for example be luminaires.

BACKGROUND

Light emitting panel assemblies use light guides to transmit light from point light sources such as light emitting diodes (LEDs) to extraction elements where the light is extracted. Luminaires are an example of light emitting panel assemblies.

One objective in lighting is to provide even illuminance on a work plane, which can be achieved by providing a lighting distribution known in the art as a "batwing" distribution. Another objective in lighting is to eliminate or reduce glare. Glare is an effect of luminance at high vertical angles that can cause visual discomfort to users.

Luminance of a light emitting panel assembly is determined by dividing luminous intensity by projected area at a particular angle.

Conventional light emitting panel assemblies are horizontally oriented, i.e., the light emitting panel assembly is wider than it is tall. This configuration allows light to leave towards the work plane from traditional sources such as fluorescent and incandescent light sources. A challenge with this configuration is that projected area shrinks as the angle increases so increasing luminous intensity in order to provide even illuminance would create unacceptable levels of high vertical angle luminance, i.e., glare. Baffling is one measure that may be used to mitigate glare in horizontally-oriented light emitting panel assemblies.

Vertically oriented light emitting panel assemblies are advantageous because projected area is smaller at low vertical angles where less luminous intensity is required and projected area increases as the vertical angle increases, as illustrated for example in FIGS. 1 and 2A to 2D. This configuration allows luminous intensity to be higher at higher vertical angles compared to that of a horizontally oriented light emitting panel assembly, avoiding the problem of glare which would otherwise require resorting to additional measures such as baffling. A challenge with this configuration is that the small projected area at low vertical angles results in high luminance at these angles, as illustrated for example in FIG. 2A. While light emitting panel assemblies are typically installed above users and not in their direct field of view, too much luminance at low vertical angles can still cause visual discomfort in their peripheral field of view. Minimizing luminous intensity at lower vertical angles is thus desirable for vertically oriented light emitting panel assemblies.

A further objective in lighting is to emit visually homogenous light. Light travels through the light guide by way of total internal reflection until it is extracted. In conventional light guides light is internally reflected through the guide in an uninterrupted linear path in the plane perpendicular to the normal of the flat sides of the light guide. In conventional light guides, when the light is extracted by extraction elements the light can appear to the viewer as undesirable visible lines of light emanating from the light sources. The visual definition of these lines, or "head lamping", can vary depending on the type of extraction elements used, the distance between the extraction elements and the light source(s), and the width or thickness of the light guide. Reducing or eliminating these visible lines of light, and emitting light which is more visually homogenous across the emitting surface, are desirable.

SUMMARY

The inventions described herein have many aspects, some of which relate to light emitting panel assemblies, such as luminaires.

In one aspect, a light emitting panel assembly is provided. The light emitting panel assembly comprises: a housing; a light guide within the housing, the light guide comprising a first major surface comprising a plurality of extraction elements, a second major surface, a lower surface, an upper surface, a light source adjacent to the lower surface of the light guide; and an upper guide reflector comprising a diffuse reflective surface adjacent to and facing the upper surface of the light guide, whereby light from the light source traveling through the light guide toward the upper guide reflector spreads within the light guide, and whereby the upper guide reflector homogenizes the light before the light is redirected to the light guide.

The upper guide reflector may be pressed against the upper surface of the light guide. The upper guide reflector may be laminated or coated to the upper surface of the light guide. The upper guide reflector may be co-extruded with the light guide. The upper guide reflector may be linearly diffuse, wherein a cross section of the upper guide reflector parallel to the first major surface and the second major surface is ridged or rippled.

The light emitting panel assembly may further comprise a side guide reflector adjacent to the first major surface. The side guide reflector may be semi-specular, specular or white. The side guide reflector may angle away from the light guide and the opposing light guide in the downward direction at angle of 2 to 15 degrees. The side guide reflector may comprise a lower extension extending horizontally toward the light source.

The light guide may be vertically oriented or may be angled away from the vertical.

The light emitting panel assembly may further comprise: an opposing light guide within the housing positioned in lateral opposition to the light guide, wherein the light guide and the opposing light guide define lateral boundaries of a cavity therebetween, the opposing light guide comprising: a first major surface comprising a plurality of extraction elements, a second major surface, a lower surface, an upper surface, an opposing light source adjacent to the lower surface of the opposing light guide; an opposing upper guide reflector comprising a diffuse reflective surface adjacent to and facing the upper surface of the opposing light guide; and an upper reflector defining an upper boundary of the cavity. The opposing upper guide reflector may be pressed against the upper surface of the opposing light guide, laminated or coated to the upper surface of the opposing light guide, or co-extruded with the opposing light guide. The opposing upper guide reflector may be linearly diffuse, wherein a cross section of the opposing upper guide reflector parallel to the first major surface and the second major surface of the opposing light guide is ridged or rippled. The light emitting panel assembly may further comprise an opposing side guide reflector adjacent to the first major surface of the opposing light guide. The opposing side guide reflector may be semi-specular, specular or white. The upper reflector may comprise a diffuse surface, and is semi-specular, specular or white. A width of the upper reflector may be at least twice a height of the light guide. A lower section of each of the light guide and the opposing light guide comprises an integral or separate lower lip may extend horizontally toward the cavity, wherein the lip comprises a diffuse upper surface and/or a diffuse lower surface for homogenizing light from the light source and directed at the upper reflector. The light guide and the opposing light guide may be vertically oriented or may be angled away from the vertical.

Each of the plurality of extraction elements may comprise an upper face and a lower face that define an inwardly extending depression in the first major face. The lower face may be shorter than the upper face, whereby a width of the light guide decreases in a downward direction. An angle of the lower face relative to a plane of the first major face may be less than an angle of the upper face relative to the plane of the first major face, whereby a width of the light guide decreases in a downward direction. A height of the plurality of extraction elements may increase in a downward direction. A distance between each of the plurality of extraction elements may decrease in a downward direction.

Each of the plurality of extraction elements may be configured such that light extracted while travelling upward in the light guide and the opposing light guide is limited to leaving at an angle high enough to remain within the cavity.

Each of the plurality of extraction elements may comprise a step narrowing the light guide and the opposing light guide in the downward direction, whereby only light travelling downward in the light guide or the opposing light guide is extracted from the plurality of extraction elements. A height of the plurality of extraction elements may increase in a downward direction. A distance between each of the plurality of extraction elements may decrease in a downward direction. Angles of the step relative to a plane of the first major surface may increase in a downward direction. The light guide and the opposing light guide may be vertically oriented or may be angled away from the vertical.

The lower surface of the light guide and the light source may be spaced apart to define a triangular gap wherein an open side of the triangular gap faces the side guide reflector.

The second major surface may comprise a plurality of extraction elements. Each of the plurality of extraction elements of the first major surface and the second major surface may comprise a step narrowing the light guide in the downward direction, whereby only light travelling downward in the light guide is extracted from the plurality of extraction elements. A height of the plurality of extraction elements may increase in a downward direction. A distance between each of the plurality of extraction elements may decrease in a downward direction. Angles of the step relative to a plane of the first major surface may increase in a downward direction. The light emitting assembly may further comprise a convex upper reflector, wherein the light guide is disposed below a middle region of the convex upper reflector.

In another aspect, a light emitting panel assembly is provided. The light emitting panel assembly comprises: a housing; a plurality of light guides within the housing, each light guide comprising a first major surface comprising a plurality of extraction elements, a second major surface, a lower surface, an upper surface, a plurality of light sources, each one of the light sources adjacent to the lower surface of a corresponding one of the light guides; and a plurality of upper guide reflectors, each upper guide reflector comprising a diffuse reflective surface adjacent to and facing the upper surface of a corresponding one of the light guides, whereby light from the light sources traveling through the light guides toward the upper guide reflectors spreads within the light guides, and whereby the upper guide reflectors homogenize the light before the light is redirected to the light guides. The plurality of light guides may comprise three light guides in a triangular arrangement. The plurality of light guides may comprise two pairs of opposing light guides in a square or rectangular arrangement. The plurality of light guides may comprise a plurality of pairs of opposing light guides in a polygonal arrangement.

In another aspect, a light emitting panel assembly is provided. The light emitting panel assembly comprises: a housing; a hollow cylindrical light guide within the housing, the light guide comprising a first major surface comprising a plurality of extraction elements, a second major surface, a lower surface, an upper surface, a circumferentially arranged light source adjacent to the lower surface of the light guide; and a circumferentially arranged upper guide reflector comprising a diffuse reflective surface adjacent to and facing the upper surface of the light guide, whereby light from the light source traveling through the light guide toward the upper guide reflector spreads within the light guide, and whereby the upper guide reflector homogenizes the light before the light is redirected to the light guide. The hollow cylindrical light guide may be a hollow circular cylindrical light guide.

In another aspect, a luminaire comprising a light emitting panel assembly as described above is provided.

The foregoing discussion merely summarizes certain aspects of the inventions and is not intended, nor should it be construed, as limiting the inventions in any way.

BRIEF DESCRIPTION OF THE DRAWINGS

In drawings which show non-limiting embodiments of the invention:

FIGS. 7A and 7B show paths of exemplary light rays initially refracting off a lower lip of the light guide of the embodiment shown in FIG. 3;

FIGS. 8A and 8B show paths of exemplary light rays initially internally reflecting to a top of the light guide of the embodiment shown in FIG. 3;

FIGS. 9A and 9B show paths of exemplary light rays initially internally reflecting to a top of the light guide of the embodiment shown in FIG. 3;

FIG. 10 is an optical distribution plot of light emitted at various luminous intensities (in candelas) from the embodiment shown in FIG. 3 in accordance with FIGS. 8A, 8B, 9A and 9D, that is, without the contribution of reflectance off the upper reflector;

FIGS. 19A and 19B show paths of exemplary light rays initially internally reflecting to a top of the light guide of the embodiment shown in FIG. 16;

FIGS. 20A and 20B show paths of exemplary light rays initially internally reflecting to a top of the light guide of the embodiment shown in FIG. 16;

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The term "adjacent" as used in this specification refers to being near or adjoining. Adjacent features can be spaced apart from one another or can be in direct contact with one another. In some instances, adjacent features can be connected to one another or can be formed integrally with one another.

The term "inwardly" as used in this specification refers to a direction toward the cross-sectional center of the light guide.

The term "outwardly" as used in this specification refers to a direction away from the cross-sectional center of the light guide.

The terms "upper", "upward", and like terms as used in this specification refers to a direction away from where the light source is located.

The terms "lower", "downward", and like terms as used in this specification refer to a direction toward where the light source is located.

The term "low angle" as used in this specification refers to an angle of approximately 0 to 15 degrees from the vertical.

The term "peak angle" as used in this specification refers to an angle of approximately 10 to 50 degrees from the vertical.

Figure 1:
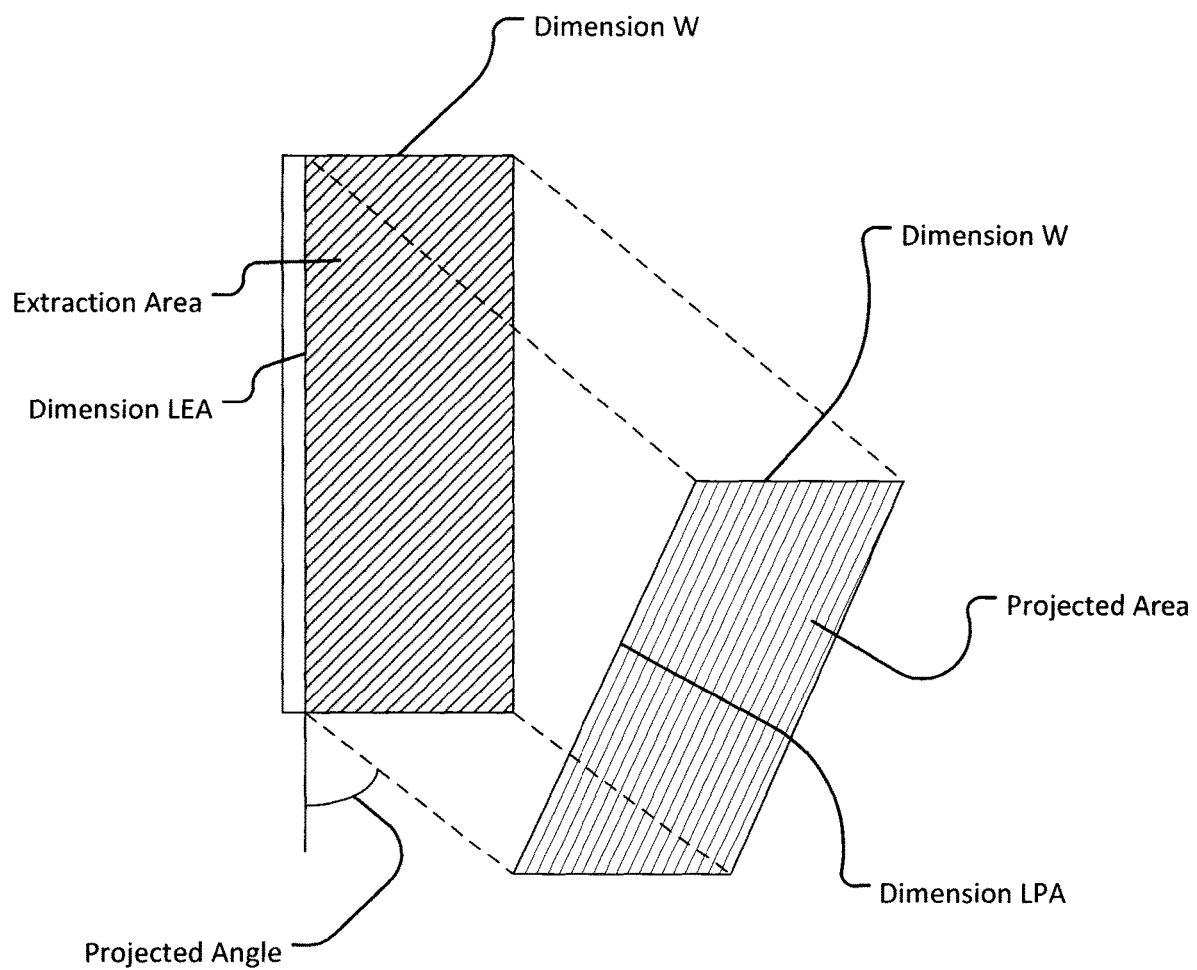
FIG. 1 is an isometric view of a vertically oriented light guide.
Figure 2A:
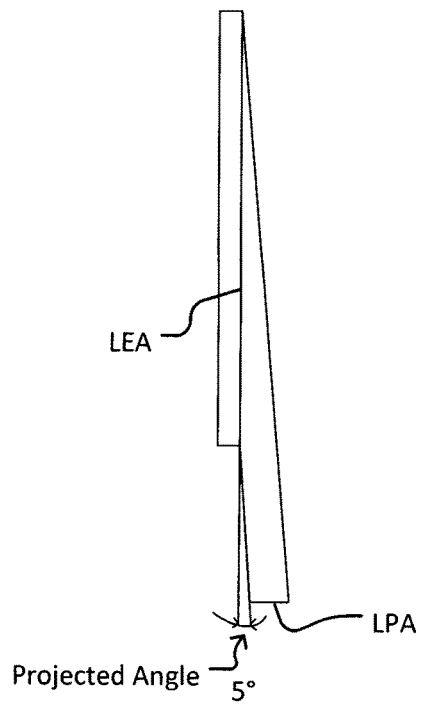
FIGS. 2A to 2D are end views of the light guide of FIG. 1 illustrating projected area at progressively higher angles.
Figure 2B:
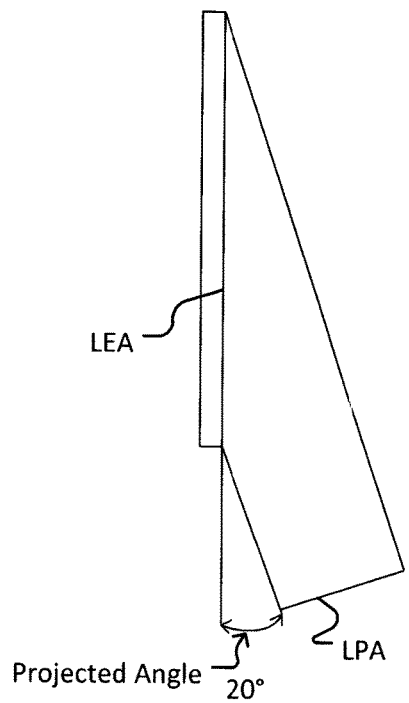
Figure 2C:
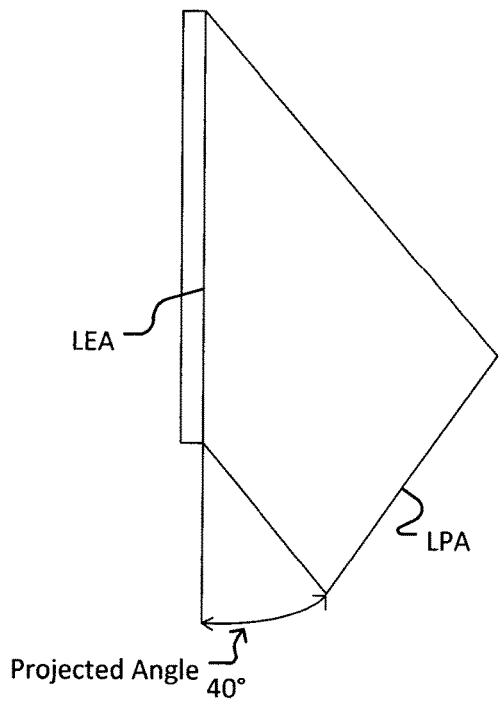
Figure 2D:
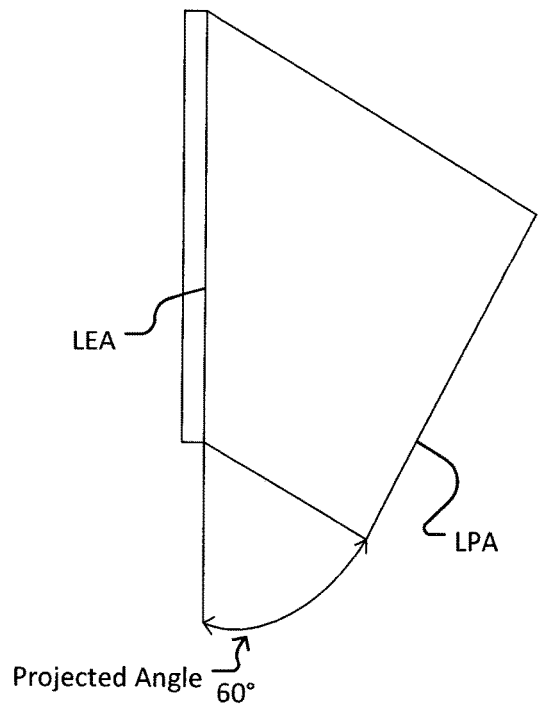
Figure 3:
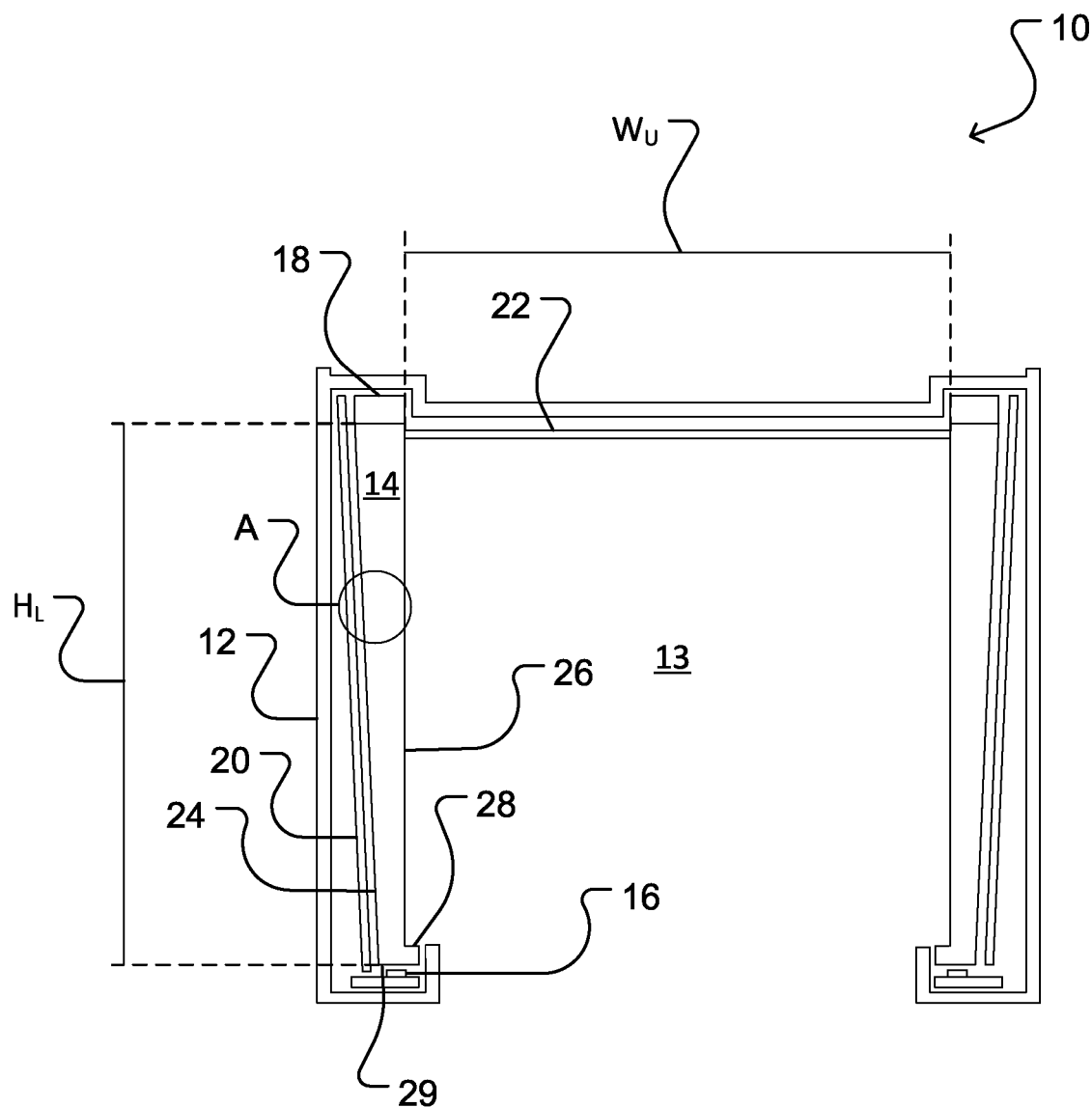
FIG. 3 is a cross-sectional view of a light emitting panel assembly according to an example embodiment.

FIG. 3 shows a light emitting panel assembly 10 according to an embodiment of the invention. Light emitting panel assembly 10 has a housing 12. Light guides 14 are vertically disposed on both sides of housing 12. Light guides 14 partially define a cavity 13 between them. Light emitting panel assembly 10 also includes light sources 16, upper guide reflectors 18, side guide reflectors 20, and upper reflector 22.

Light source 16 is a light emitting diode (LED) or an array of LEDs. In some embodiment light source 16 may be any other point source emitter of light, including laser diodes and the like. Light source 16 is adjacent to a lower surface 29 of light guide 14. In some embodiments light source 16 squarely faces lower surface 29. In some embodiments light source 16 may be in contact with lower surface 29. In some embodiments light source 16 may be spaced apart from lower surface 29. For example, spacer elements disposed between individual LEDs may be used to space light source 16 apart from lower surface 29. The space or lack thereof between light source 16 and lower surface 29 determines the quantity of light entering light guide 14 in the upward direction and conversely the amount of light illuminating upper reflector 22 directly. In some embodiments lower surface 29 of light guide 14 may have a diffuse surface to homogenize light entering light guide 14.

Light guide 14 is generally planar, and has a first major surface 24 facing away from cavity 13 and a second major surface 26 facing toward cavity 13.

Figure 15:
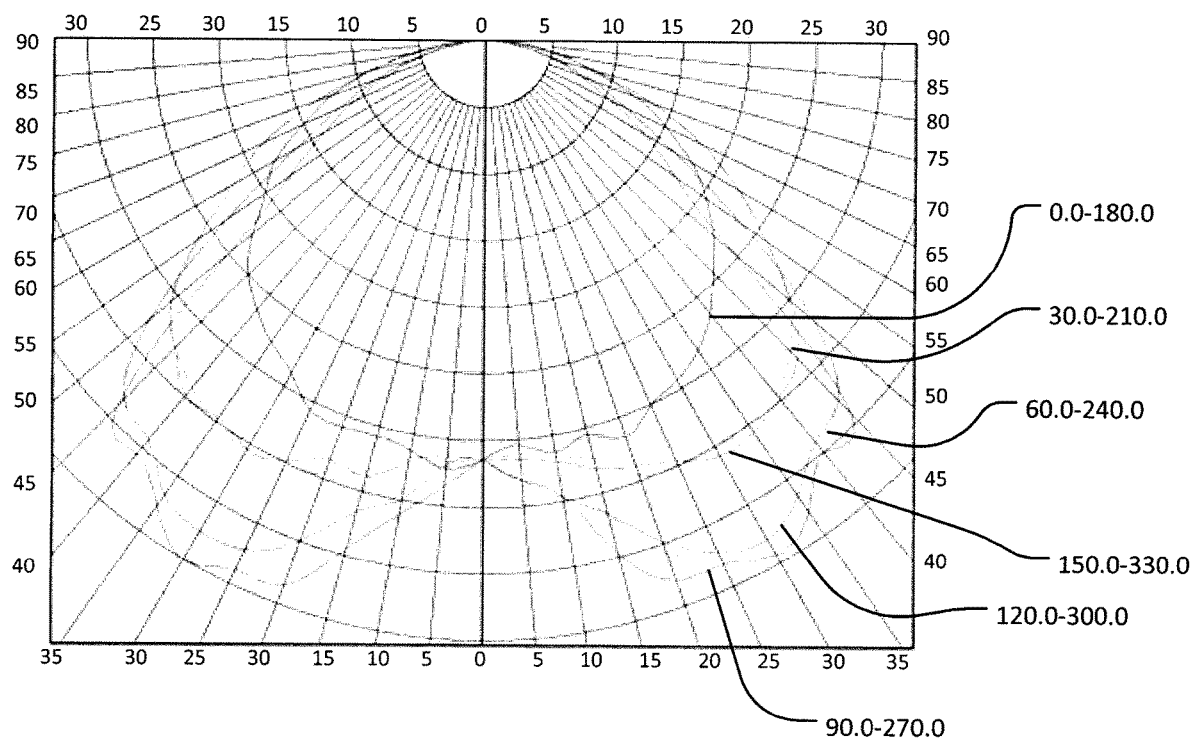
FIG. 15 is an optical distribution plot of light emitted at various luminous intensities (in candelas) from the embodiment shown in FIG. 3.

Light guide 14 decreases in width in the downward direction. In the embodiment shown, the decrease in width is due to the shape of extraction elements 30 on first major surface 24; for example, and with reference to FIG. 4A, the decreasing width may be achieved by lower face 34 being shorter than upper face 32 and/or by angle $A_L$ being less than angle $A_U$. The individual sections between extraction elements 30 along first major surface 24 are parallel to second major surface 26. The downward decrease in width of light guide 14 results in a greater capacity for light extraction from a lower region of light guide 14 (see FIGS. 5 and 6), and lesser capacity for light extraction from an upper region of light guide 14 (see FIGS. 8 and 9). This balances out the greater amount of light available for extraction at the upper region of light guide 14 (after reflecting off upper guide reflector 18), resulting in a more even extraction of light from the top to the bottom of light guide 14. This even extraction of light contributes to the desirable peaks of the angle batwing distribution shown in FIGS. 10 and 15.

In some embodiments light guide 14 may not decrease in width in the downward direction, that is, first major surface 24 and second major surface 26 may extend parallel to one another.

Light guide 14 also has a lower lip 28 extending toward cavity 13. In some embodiments, lower lip 28 may be absent. In some embodiments the lip may be a separate part. In some embodiments the lip may have a diffuse upper and/or lower surface to homogenize light travelling upward through the lip and illuminating upper reflector 22.

Upper guide reflector 18 is adjacent to upper surface 32 of light guide 14. Upper guide reflector 18 has a diffuse reflective surface facing upper surface 32. In some embodiments the upper guide reflector 18 may be partially specular. For example, upper guide reflector 18 may be a highly reflective white film. Diffuse reflection homogenizes the light from light guide 14. In some embodiments, upper guide reflector 18 is pressed against upper surface 32. In some embodiments upper guide reflector 18 is integrated with upper surface 32, for example by lamination or coating. In some embodiments, upper guide reflector 18 may be co-extruded with light guide 14. Integration of upper guide reflector 18 with upper surface 32 of light guide 14 reduces boundary losses of light by avoiding having the light exit and re-enter light guide 14.

In some embodiments, upper guide reflector 18 may be textured to reflect more light back into light guide 14 at a lower angle from the vertical, to facilitate even emission of light down the vertical extent of light guide 14. For example, upper guide reflector 18 may be linearly diffuse such that a cross sectional plane of upper guide reflector 18 parallel to first major surface 24 and second major surface 26 is ridged or rippled.

Side guide reflector 20 extends parallel and adjacent to first major surface 24. In some embodiments, the distance $D_S$ between side guide reflector 20 and first major surface 24 is minimized, that is, less than 5 mm, or 2 mm, or 1 mm. Side guide reflector 20 may be specular, semi-specular or white. In some embodiments side guide reflector 20 may be pressed against or laminated to first major surface 24 such that the only space between them would be at the extraction elements.

Side guide reflector 20 angles inwardly as it extends downward, in parallel to the decreasing width of first major surface 24 in the downward direction. In embodiments wherein first major surface 24 does not decrease in width in the downward direction, side guide reflector 20 may angle inwardly as it extends downward, or go straight downward. The inward angling of side reflector 20 is to compensate for light refracting out extraction elements 30 on first major surface 24, as shown for example in FIG. 9, at a lower angle than light internally reflecting off extraction elements 30, as shown for example in FIG. 8. In some embodiments the angle of side guide reflector 20 may be 2 to 15 degrees from the vertical.

Upper reflector 22 spans between upper sections of opposing light guides 14. Upper reflector 22 has a fully diffuse surface. Upper reflector 22 may be specular, semi-specular or white. Upper reflector 22 defines an upper boundary of cavity 13. In some embodiments, for example wherein light emitting panel assembly 10 is very narrow, upper reflector 22 may be absent.

Figure 4A:
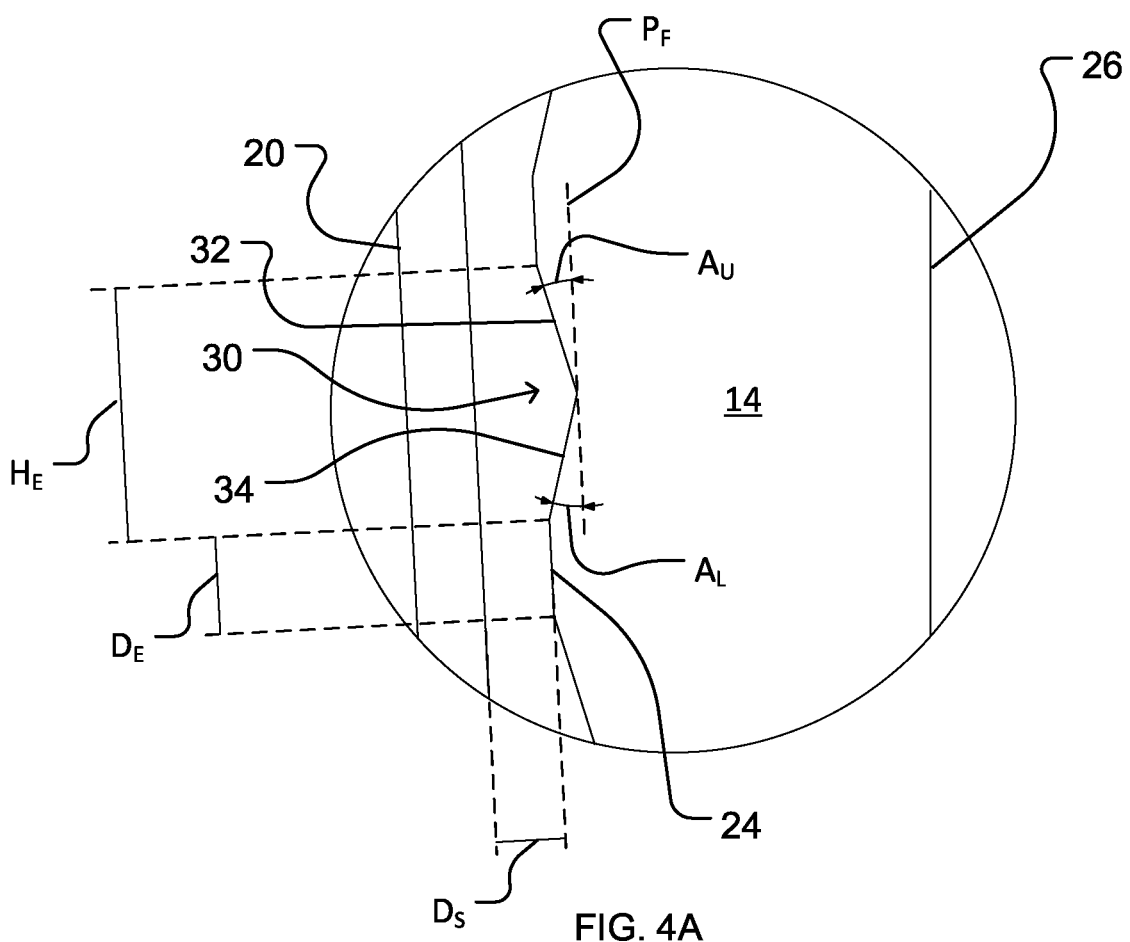
FIG. 4A is a close-up view of section A of the embodiment shown in FIG. 3.

As best shown in FIG. 4A, first major surface 24 has a plurality of extraction elements 30 and second major surface 26 has no extraction elements. In some embodiments second major surface 26 may have extraction elements. Extraction elements 30 are shaped to extract both light travelling upward and light travelling downward within light guide 14. Each extraction element 30 has an upper face 32 and lower face 34 that together define an inwardly extending depression in first major face 24. In some embodiments, relative to plane $P_F$ parallel to first major face 24, upper face 32 angles inwardly at an angle $A_U$ of 2 to 25 degrees, or 10 to 20 degrees, or about 15 degrees, and lower face 34 angles inwardly at an angle $A_L$ of 2 to 25 degrees, or 10 to 20 degrees, or about 15 degrees. In some embodiments, upper face 32 and lower face 34 may be symmetrical, that is, their dimensions may be identical and angles $A_U$ and $A_L$ may be identical.

In some embodiments, upper face 32 and lower face 34 may not be symmetrical. For example, as mentioned above, lower face 34 is shorter than upper face 32 and/or $A_L$ is less than $A_U$ to facilitate even extraction of light along light guide 14. As another example, angles $A_U$ and $A_L$ may different in order to ensure an even distribution of light across upper reflector 22.

Extraction element 30 has a height $H_E$. In some embodiments, height $H_E$ is negatively correlated to a height $H_L$ of light guide 14; that is, the taller the light guide, the smaller the extraction elements since they would need to release less light, and vice versa.

In some embodiments height $H_E$ of extraction elements 30 increases in the downward direction along light guide 14. In some embodiments the distance $D_E$ between extraction elements 30 decreases in the downward direction along light guide 14 to increase the density of extraction elements 30 in a lower region of light guide 14. The foregoing features, individually and in combination, provide greater light extraction capacity at a lower region of light guide 14 compared to an upper region of light guide 14, resulting in more even extraction of light from the top to the bottom of light guide 14 and thus contributing to the desirable peak angle batwing distribution shown in FIGS. 10 and 15.

Figure 4B:
FIGS. 4B to 4D are close-up cross-section views of extraction elements according to example embodiments.
Figure 4C:
Figure 4D:

In some embodiments, extraction element 30 may have a shape different than that illustrated in FIG. 4A, but still extract light travelling upward and downward in light guide 14. FIGS. 4B to 4D are non-limiting examples of other possible shapes of extraction element 30.

FIGS. 5A, 5B, 6A, 6B, 7A, 7B, 8A, 8B, 9A and 9B illustrate exemplary paths of rays of light emitted from light source 16 of light emitting panel assembly 10.

Figure 5A:
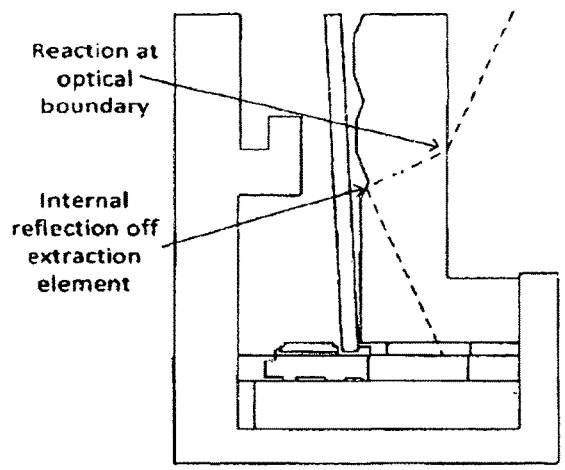
FIGS. 5A and 5B show paths of exemplary light rays initially internally reflecting off a lower portion of an extraction element of the embodiment shown in FIG. 3.
Figure 5B:
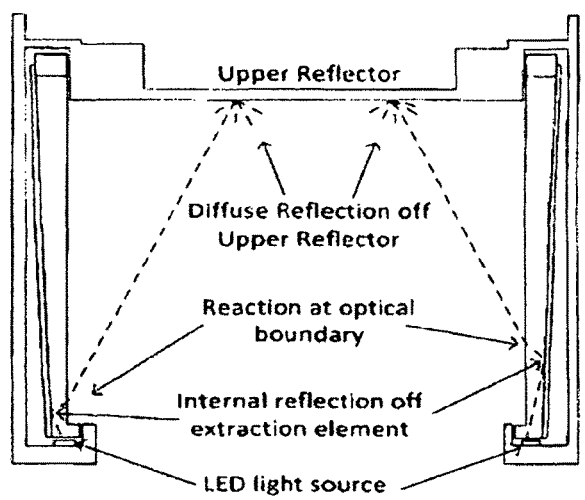

FIGS. 5A and 5B illustrate rays of light which internally reflect off an extraction element 30 of first major surface 24 in a lower region of light guide 14, refract out of second major surface 26 into cavity 13 toward upper reflector 22, and reflect off upper reflector 22 into cavity 13 to a workspace.

Figure 6A:
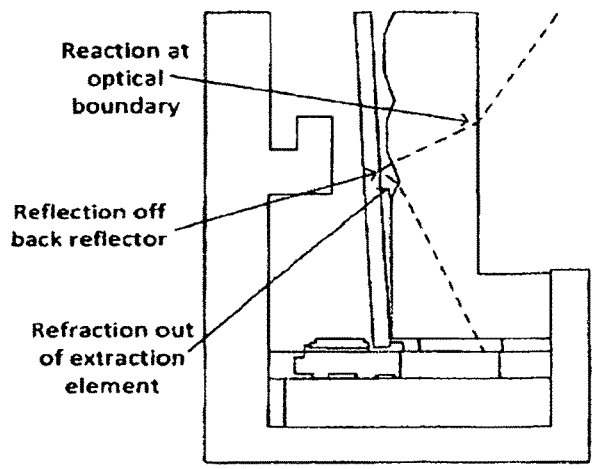
FIGS. 6A and 6B show paths of exemplary light rays initially refracting off a lower portion of an extraction element of the embodiment shown in FIG. 3.
Figure 6B:
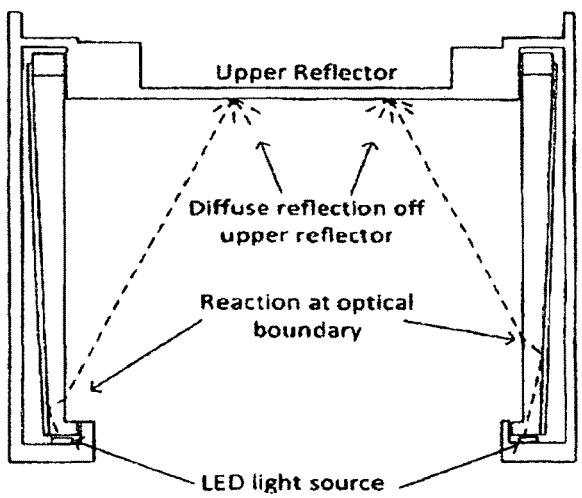

FIGS. 6A and 6B illustrate rays of light which refract out of an extraction element 30 of first major surface 24 in a lower region of light guide 14, reflect off of side guide reflector 20, refract through first major surface 24 and second major surface 26 into cavity 13 toward upper reflector 22, and reflect off upper reflector 22 into cavity 13 to a workspace.

FIGS. 7A and 7B illustrate rays of light which refract through lower lip 28 into cavity 13 toward upper reflector 22, and reflect off upper reflector 22 into cavity 13 to a workspace.

Light rays such as those generally following the paths illustrated in FIGS. 5A, 5B, 6A, 6B, 7A and 7B combine to illuminate upper reflector 22 to create a homogenous luminance surface. Light leaving this surface provides the low angle light distribution of the light distribution shown in FIG. 15. FIG. 10 shows a light distribution of light emitting panel assembly 10 without upper reflector 22, that is, without the contribution of light rays generally following the paths illustrated in FIGS. 5A, 5B, 6A, 6B, 7A and 7B.

FIGS. 8A and 8B illustrate rays of light which internally reflect up to the top of light guide 14, reflect off upper guide reflector 18, internally reflect down light guide 14, internally reflect off extraction element 30 in an upper region of light guide 14, and refract out of second major surface 26 into cavity 13 to a workspace.

FIGS. 9A and 9B illustrate rays of light which internally reflect up to the top of light guide 14, reflect off upper guide reflector 18, internally reflect down light guide 14, refract out of an extraction element 30 in a upper region of light guide 14, reflect off of side guide reflector 20, and then refract through first major surface 24 and second major surface 26 into cavity 13 to a workspace.

Light rays such as those generally following the paths illustrated in FIGS. 8A, 8B, 9A and 9B advantageously mix and spread with light rays from adjacent LEDs from the LED array as they travel from light source 16 to upper guide reflector 18. Light reflecting off upper guide reflector 18 is homogenized, eliminating "head lamping" effects, and reenters light guide 14. These light rays contribute to the desirable peak angle batwing distribution shown in FIGS. 10 and 15.

Figure 11:
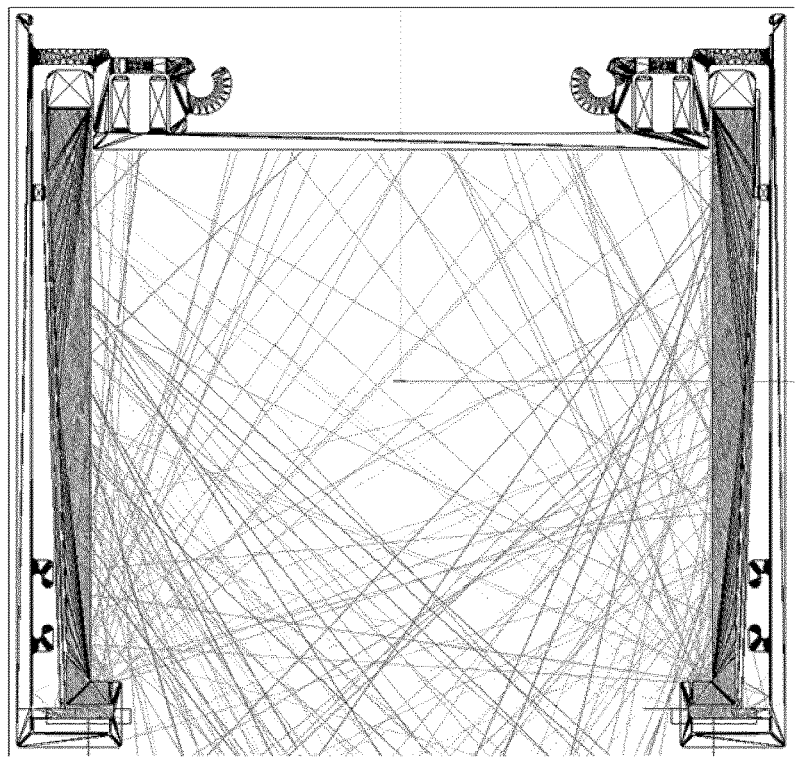
FIG. 11 shows exemplary simulated light ray traces that produce the optical distribution plot of light according to FIG. 10.
Figure 12:
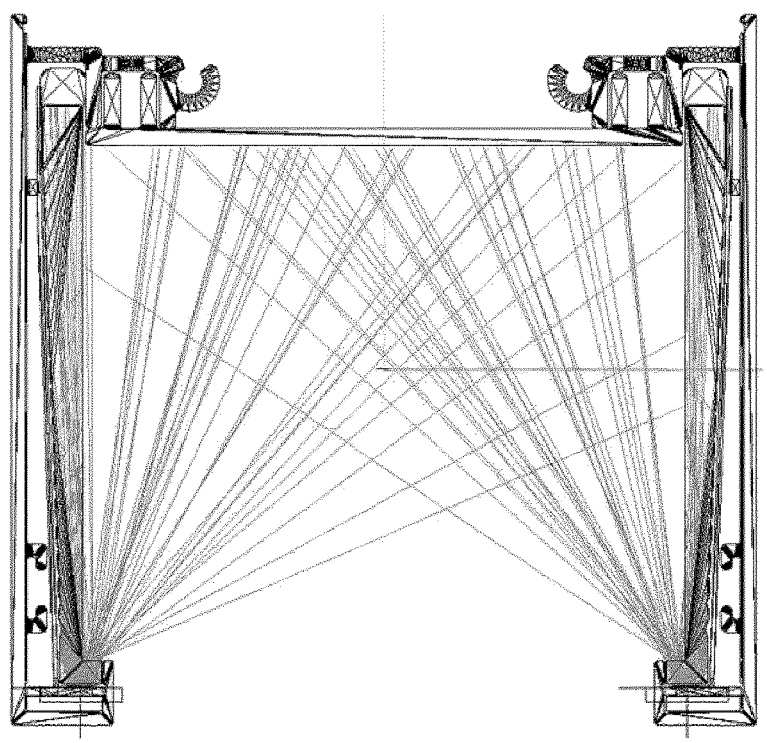
FIG. 12 shows exemplary simulated light ray traces of two ray reactions in the embodiment shown in FIG. 3.
Figure 13:
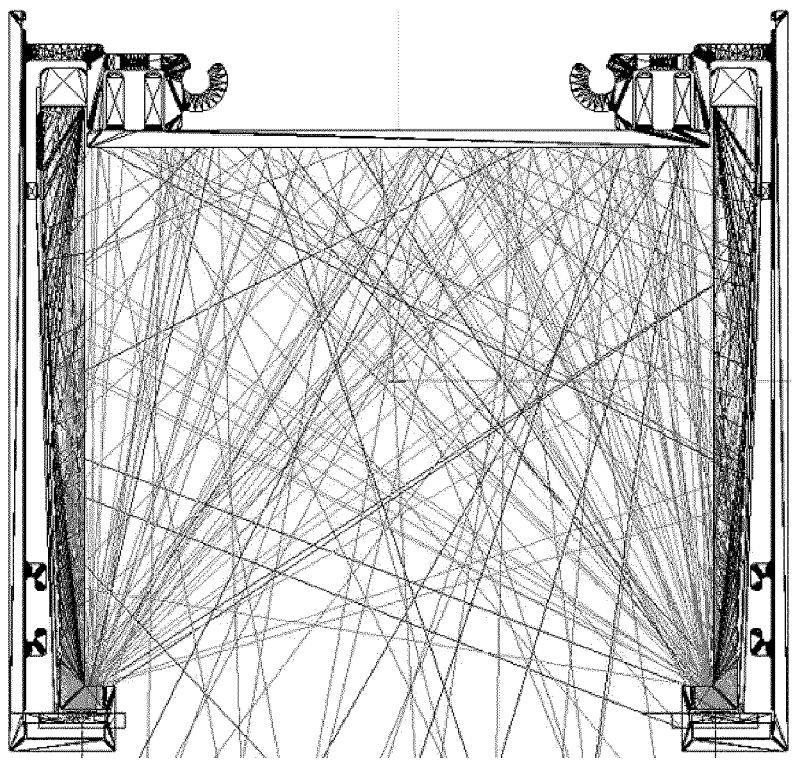
FIG. 13 shows exemplary simulated light ray traces of four ray reactions in the embodiment shown in FIG. 3.
Figure 14:
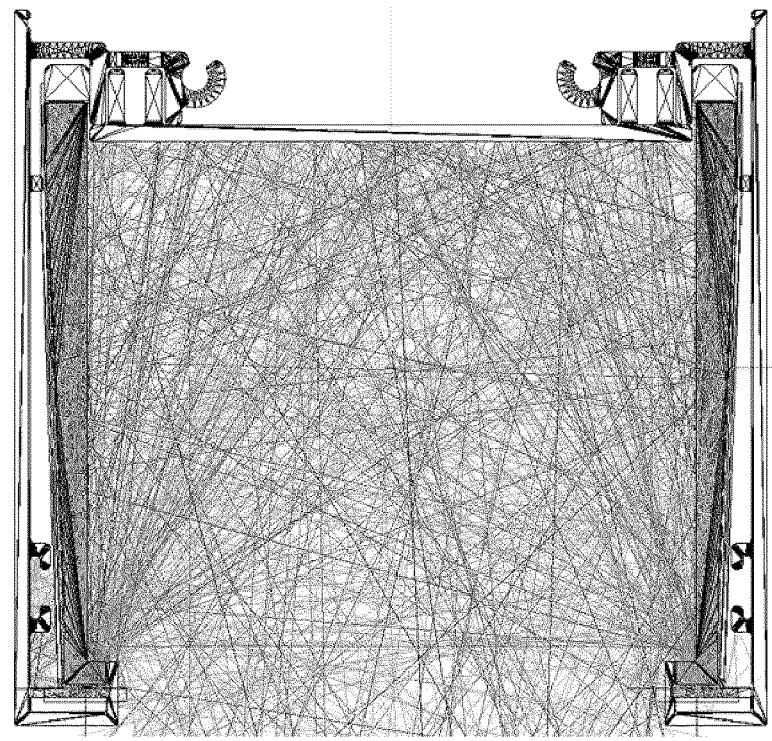
FIG. 14 shows exemplary simulated light ray traces of one hundred ray reactions in the embodiment shown in FIG. 3.

FIG. 11 shows exemplary simulated light ray traces of light emitting panel assembly 10 without upper reflector 22. FIGS. 12 to 14 show exemplary simulated light ray traces of light emitting panel assembly 10 of two ray reactions, four ray reactions, and one hundred ray reactions respectively according to example embodiments. The two ray reaction shown in FIG. 12 isolates the simulation to rays primarily such as those rays shown in FIGS. 5A, 5B, 6A, 6B, 7A and 7B, that is, light refracting out of a lower region or lower lip 28 of light guide 14 upward toward upper reflector 22 to illuminate upper reflector 22. The four ray reaction shown in FIG. 13 is similar to the two ray reaction of FIG. 12 but also begins to show some reflections off upper reflector 22. The one hundred ray reaction shown in FIG. 14 demonstrates full optical reactions to light emitting panel assembly 10, and the optical distribution of these reactions is plotted in FIG. 15.

Thus in light emitting panel assembly 10, light from light source 16 traveling through light guide 14 toward upper guide reflector 18 spreads within light guide 14, and upper guide reflector 18 homogenizes the light before the light is redirected to light guide 14 to be extracted by extraction elements 30 at angles visible in the lower hemisphere. In addition to allowing for improved optical distributions, the foregoing features of the present invention allow for larger spacing between individual lights within light source 16 (e.g. spacing between LEDs), resulting in cost savings with respect to light source 16.

Figure 16:
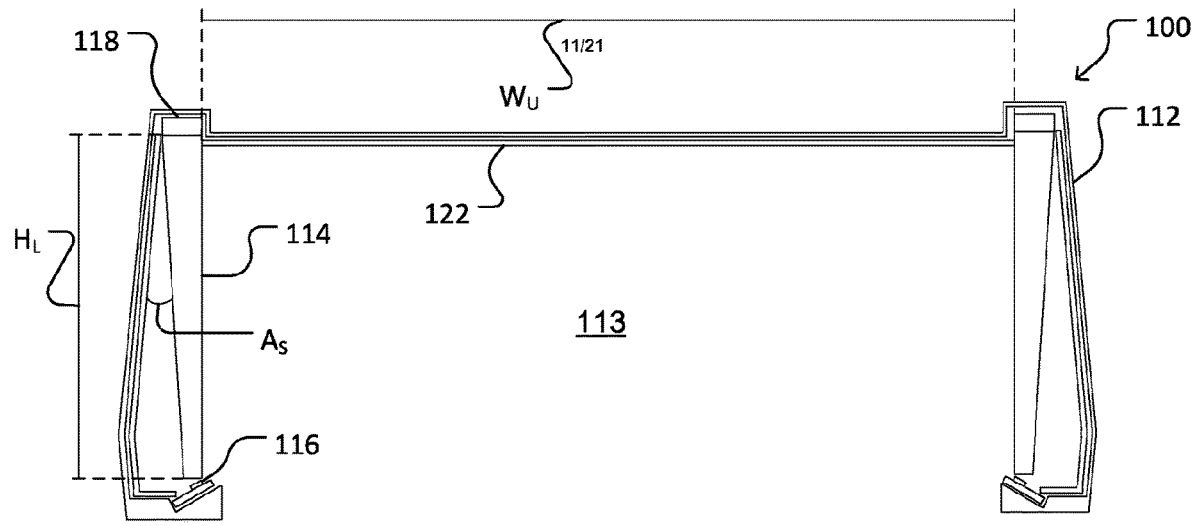
FIG. 16 is a cross-sectional view of a light emitting panel assembly according to an example embodiment.
Figure 17:
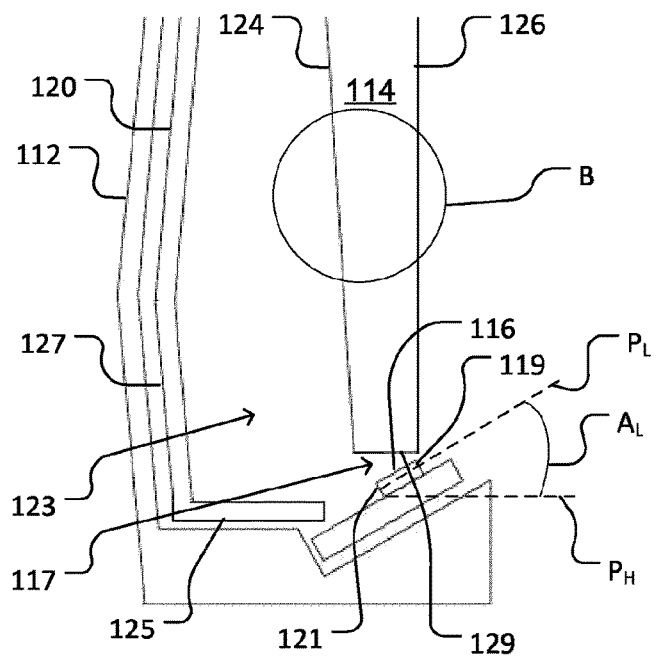
FIG. 17 is a close up of a lower section of one side of the embodiment shown in FIG. 16.

FIG. 16 shows a light emitting panel assembly 100 according to an embodiment. Light emitting panel assembly 100 has a housing 112 defining a cavity 113. A pair of light guides 114 is vertically disposed on the sides of housing 112. Light emitting panel assembly 100 also includes light sources 116, upper guide reflectors 118, side guide reflectors 120, and upper reflector 122. Compared to light emitting panel assembly 10, light emitting panel assembly 100 has a significantly wider upper reflector 122 and other differences to facilitate even distribution of light across the wider upper reflector 122. In some embodiments, width $W_U$ of upper reflector 122 is at least twice the height $H_L$ of light guides 114.

Light guide 114 and light source 116 are substantially similar to light guide 14 and light source 16 of light emitting panel assembly 10 except that lower surface 129 of light guide 114 and light source 116 are spaced apart to define a gap 117. Gap 117 is shaped to allow a predetermined amount of light from light source 116 to first reflect off side guide reflector 120 before hitting light guide 114. In some embodiments, a first edge 119 of light source 116, defined as the edge of light source 116 further from side guide reflector 120, is closer to lower surface 129 of light guide 114 than an opposite second edge 121 of light source 116. In some embodiments, first edge 119 is adjacent to, and may abut, lower surface 129. In the embodiment shown, light source 116 is angled in the direction of side guide reflector 120 to define a triangular gap 117 between light source 116 and lower surface 129. In some embodiments, an angle $A_L$ between a major plane $P_L$ of light source 116 and a horizontal plane $P_H$ ranges from or 20 to 70 degrees, or 35 to 55 degrees, or 40 to 45 degrees. In some embodiments, light source 116 is horizontal (i.e., major plane $P_L$ of light source 116 lies in horizontal plane $P_H$) but lower surface 129 is angled to define a triangular gap 117. In some embodiments, both light source 116 and lower surface 129 are angled to define a triangular gap 117.

Side guide reflector 120 angles away from light guide 114 in the downward direction. In some embodiments the angle of side guide reflector 20 may be 2 to 15 degrees from the vertical. Similar to side guide reflector 20, the angling of side reflector 120 is to compensate for light refracting out extraction elements 130 on first major surface 124, as shown for example in FIG. 20, at a lower angle than light which internally reflects off extraction elements 130, as shown for example in FIG. 19.

Side guide reflector 120 includes a lower extension 125. In some embodiments lower extension 124 extends horizontally in the direction of light source 116. In some embodiments lower extension 125 spans at least half of a gap 123 defined between a bottom region of side guide reflector 120 and a bottom region of light source 116. In some embodiments lower extension 125 may be formed as a separate reflector from the rest of side guide reflector 120. Gap 123 provides distance between light source 116 and side guide reflector 120 to perform at least two functions: (i) increases optical control over the distribution of light for illuminating upper reflector 122; and (ii) reduces the amount of light reflected back at light source 116 and thereby wasted.

Figure 18:
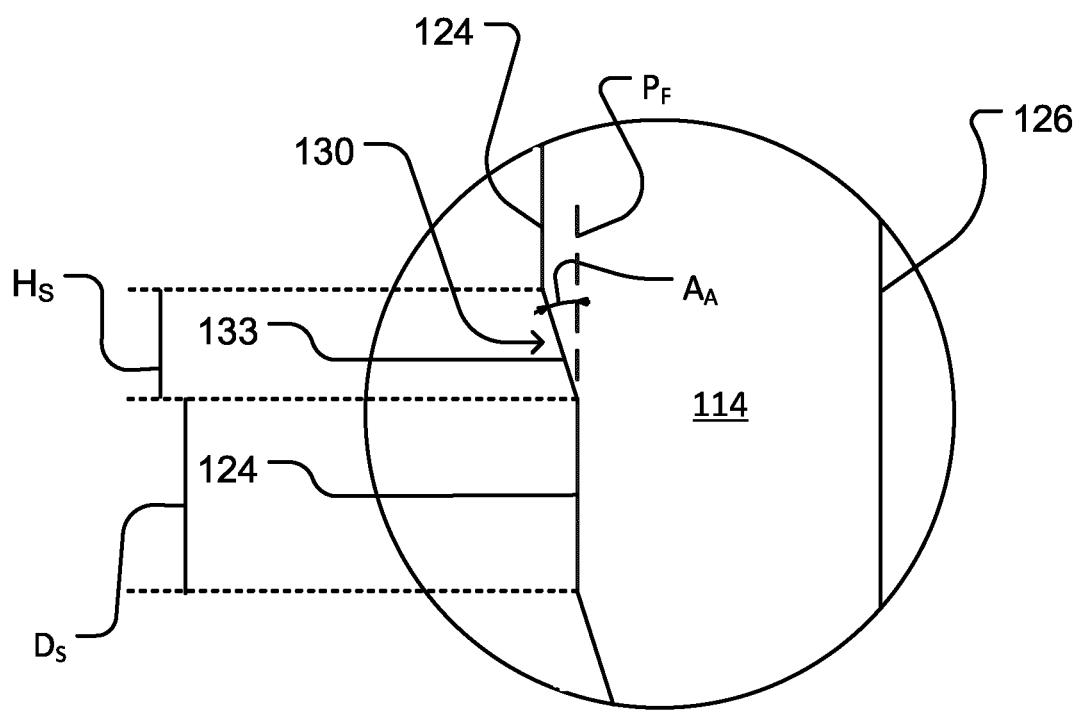
FIG. 18 is a close-up view of section B shown in FIG. 17 of the embodiment shown in FIG. 16.

As shown in FIG. 18, first major surface 124 has a plurality of extraction elements 130. In some embodiments, second major surface 126 has no extraction elements. Extraction elements 130 are configured to only extract light travelling downward in light guide 114; this advantageously preserves light for peak angle distribution as described in relation to FIGS. 19A, 19B, 20A, and 20B below. Each extraction element 30 comprises an angled step 133 that widens light guide 114 in the upward direction. In some embodiments, relative to plane $P_F$ parallel to first major face 124, angled step 133 angles outwardly at an angle $A_A$ of 2 to 25 degrees, or 10 to 20 degrees, or about 15 degrees.

Figure 23:
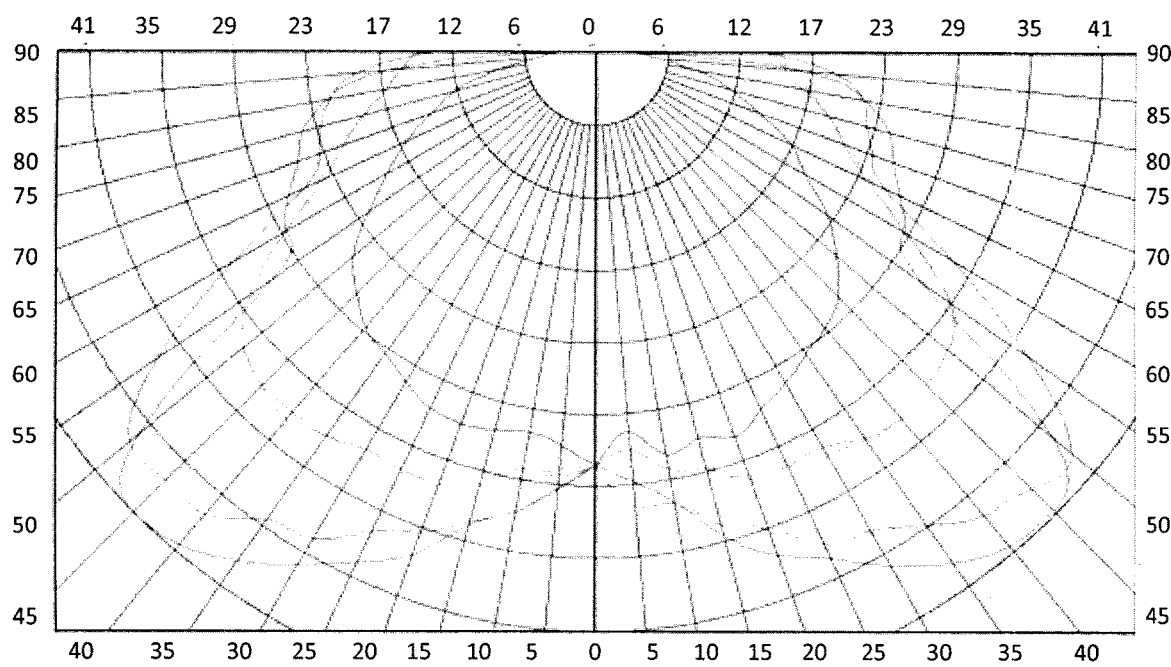
FIG. 23 is an optical distribution plot of light emitted at various luminous intensities (in candelas) from the embodiment shown in FIG. 16.

Other aspects of extraction elements 130 such as their dimensions and distribution are similar to extraction elements 30 previously discussed. For example, height $H_S$ of extraction elements 130 increases in the downward direction along light guide 114. In some embodiments the distance $D_S$ between extraction elements 130 decreases in the downward direction along light guide 114 to increase the density of extraction elements 130 in a lower region of light guide 114. In some embodiments angle $A_A$ of extraction elements 130 increases in the downward direction along light guide 114. The foregoing features, individually and in combination, provide for greater light extraction capacity at a lower region of light guide 114 compared to an upper region of light guide 114, resulting in more even extraction of light from the top to the bottom of light guide 114 and thus contributing to the desirable peak angle batwing distribution shown in FIG. 23.

FIGS. 19A, 19B, 20A, 20B, 21A and 21B illustrate exemplary paths of rays of light emitted from light source 116 of light emitting panel assembly 100.

FIGS. 19A and 19B illustrate rays of light which internally reflect up to the top of light guide 114, reflect off upper guide reflector 118, internally reflect down light guide 114, internally reflect off extraction element 130, and refract out of second major surface 126 into cavity 13 to a workspace.

FIGS. 20A and 20B illustrate rays of light which internally reflect up to the top of light guide 114, reflect off upper guide reflector 118, internally reflect down light guide 114, refract out of an extraction element 130, reflect off of side guide reflector 120, and then refract through first major surface 124 and second major surface 126 into cavity 13 to a workspace.

Light rays such as those generally following the paths illustrated in FIGS. 19A, 19B, 20A and 20B advantageously mix and spread with light rays from adjacent LEDs from the same LED array as they travel from light source 116 to upper guide reflector 118. Light reflecting off upper guide reflector 118 is homogenized, eliminating "head lamping" effects, and reenters light guide 114. These light rays contribute to the desirable peak angle batwing distribution shown in FIG. 23.

Figure 21A:
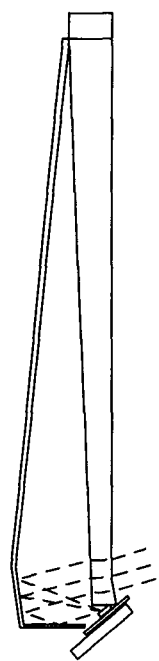
FIGS. 21A and 21B show paths of exemplary light rays initially reflecting off lower sections of the side reflector of the embodiment shown in FIG. 16.
Figure 21B:
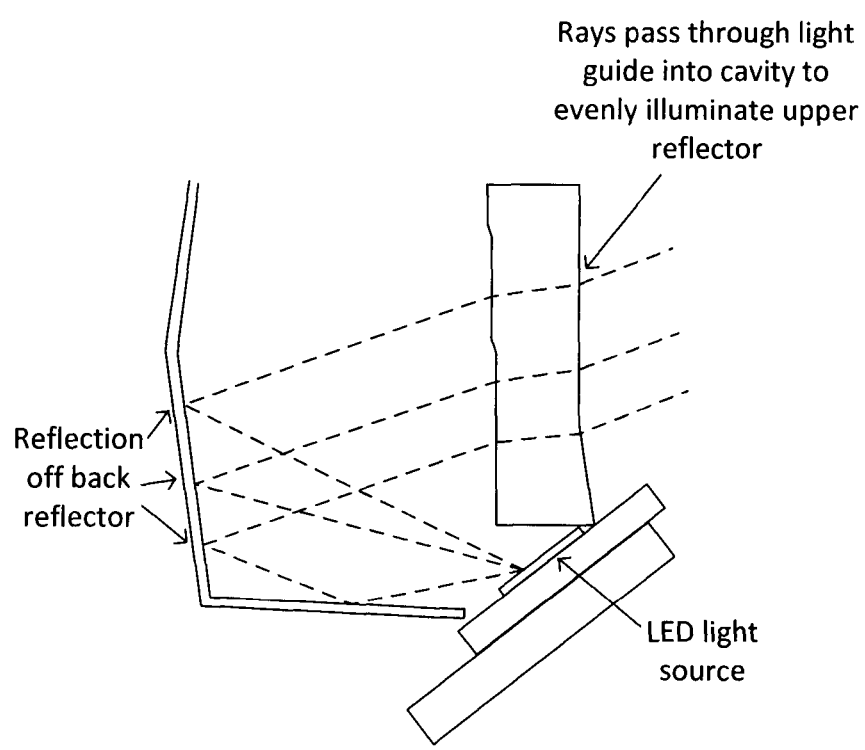

FIGS. 21A and 21B illustrate rays of light which leave light source 116 at angles at or near the horizontal such that they travel through gap 117 and gap 123 and are reflected by side guide reflector 120 (or lower extension 125 and side guide reflector 120) before refracting through first major guide surface 124 and second major surface 126 at a lower region of light guide 114 at an upward angle through cavity 113 to upper reflector 122. Side guide reflector 120 may include a bottom face 127 that is angled slightly upward to reflect light through a lower region of light guide 114 toward upper reflector 122 to facilitate even spreading of light on upper reflector 122. The light rays exemplified by FIGS. 21A and 21B create a homogenous luminance surface on upper reflector 122, and the light leaving this surface provides the low angle light distribution of the light distribution shown in FIG. 23.

Figure 22:
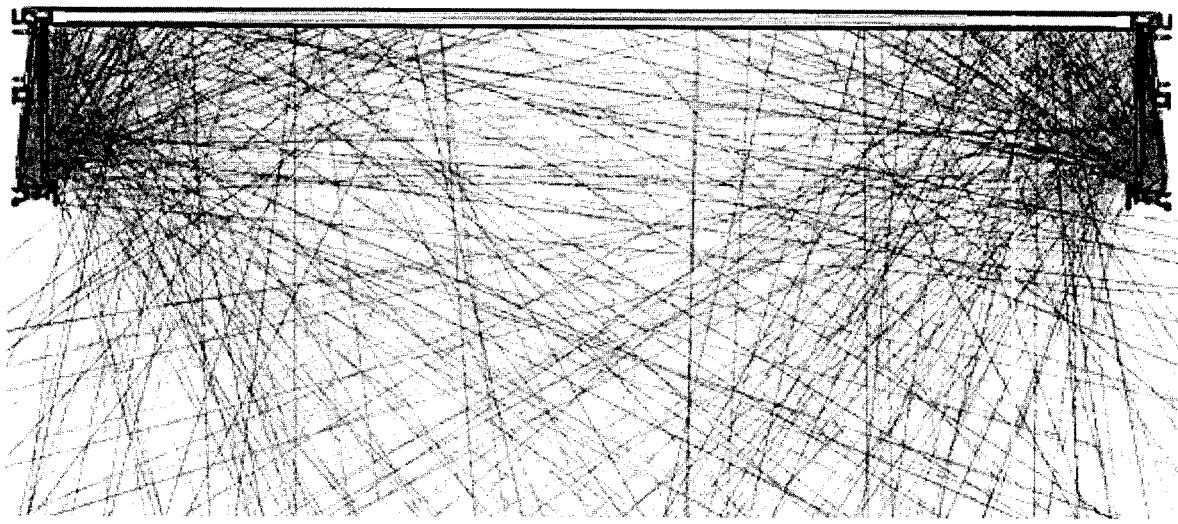
FIG. 22 shows exemplary simulated light ray traces of ray reactions of the embodiment shown in FIG. 16.
Figure 24:
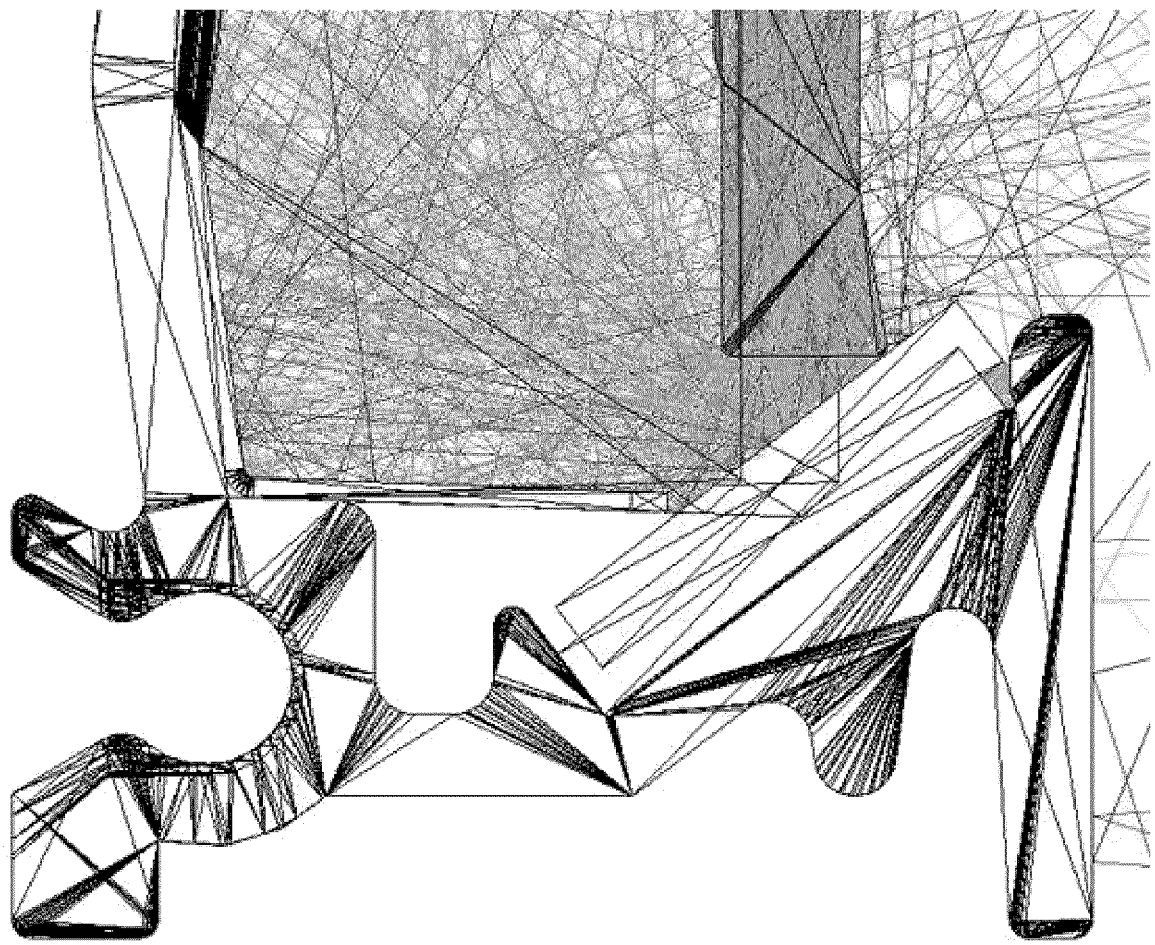
FIG. 24 shows exemplary simulated light ray traces of ray reactions at a lower section of one side of the embodiment shown in FIG. 16.
Figure 25:
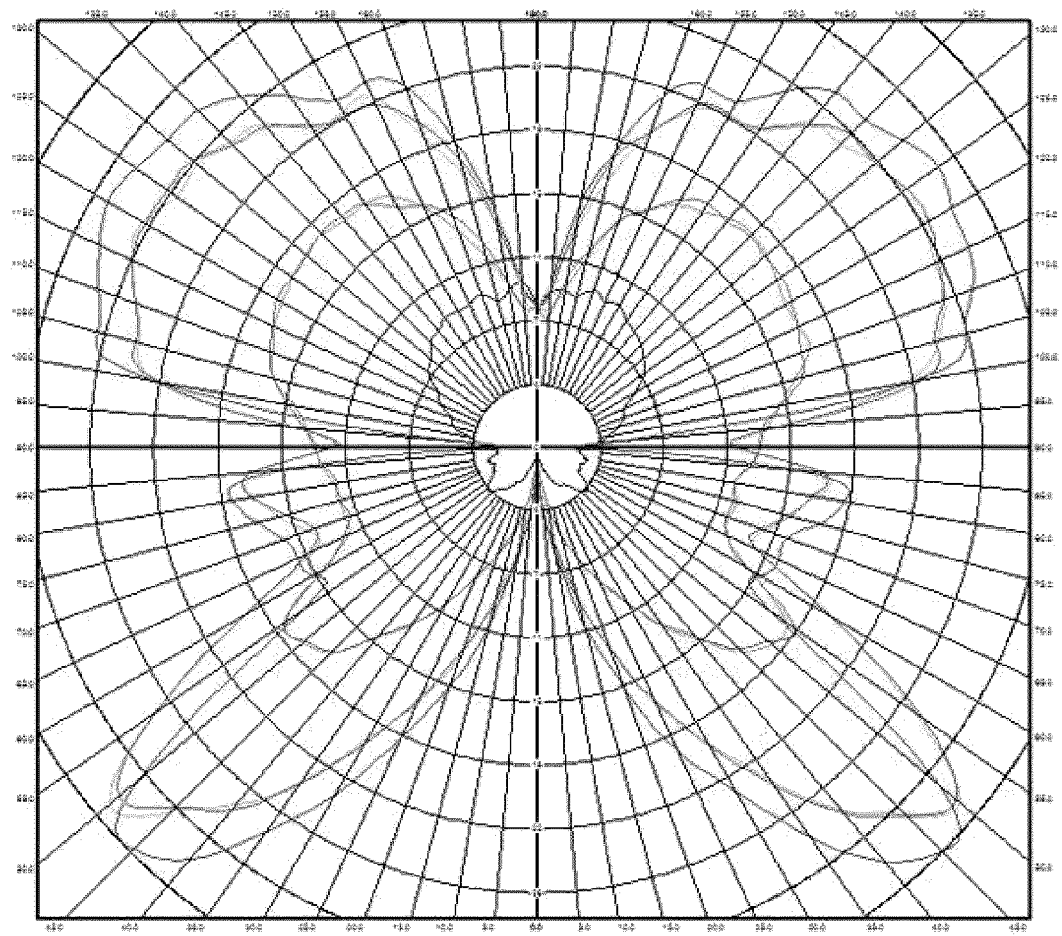
FIG. 25 is an optical distribution plot of light emitted at various luminous intensities (in candelas) from the embodiment shown in FIG. 16 except with the top portion of the housing and top reflector removed.

FIG. 22 shows exemplary simulated light ray traces of ray reactions of light emitting panel assembly 100. FIG. 24 shows exemplary simulated light ray traces of ray reactions at a lower section of one side of light emitting panel assembly 100. FIG. 25 is an optical distribution plot of light emitted from light emitting panel assembly 100 except with the top portion of the housing 112 and upper reflector 122 removed.

Figure 26:
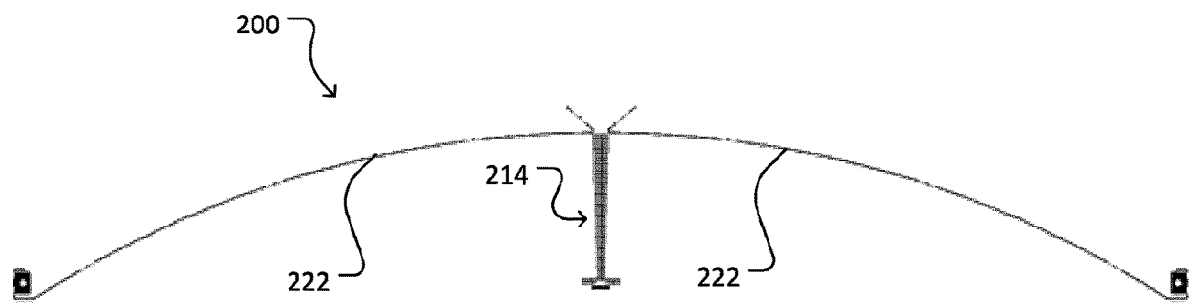
FIG. 26 is a cross-sectional view of a light emitting panel assembly according to an example embodiment.
Figure 27:
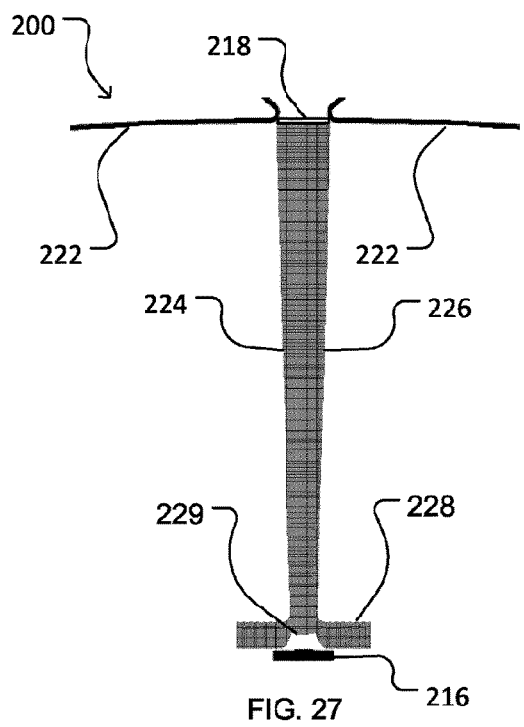
FIG. 27 is a close up of a central section of one side of the embodiment shown in FIG. 16.

FIGS. 26 and 27 shows a light emitting panel assembly 200 according to an embodiment. Light emitting panel assembly 200 includes a centrally positioned light guide 214 having a first major surface 224 and second major surface 226. Each of first major surface 224 and second major surface 226 have extraction elements (not shown) similar in features and functions to extraction elements 130 of light emitting panel assembly 100. For example, the extraction elements are configured to only extract light travelling downward in light guide 214, advantageously preserving light for peak angle distribution. Because both major surface 224 and second major surface 226 have extraction elements, downward travelling light is extracted out of both sides of light guide 214. Light emitting panel assembly 200 also includes a light source 216, upper guide reflector 218, a pair of convex reflectors 222 a pair of lips 228, and a lower surface 229, each of which are similar in feature and function to corresponding features of light emitting panel assemblies 10 and 100, except in the case of reflector 222 which is convex rather than flat.

Figure 28:
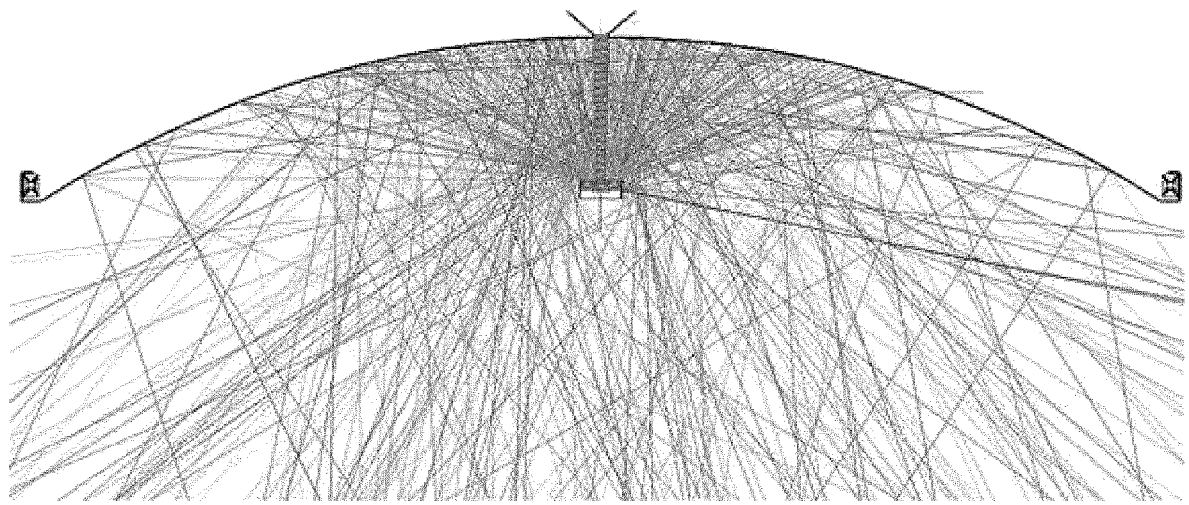
FIG. 28 shows exemplary simulated light ray traces of ray reactions of the embodiment shown in FIG. 26.
Figure 29:
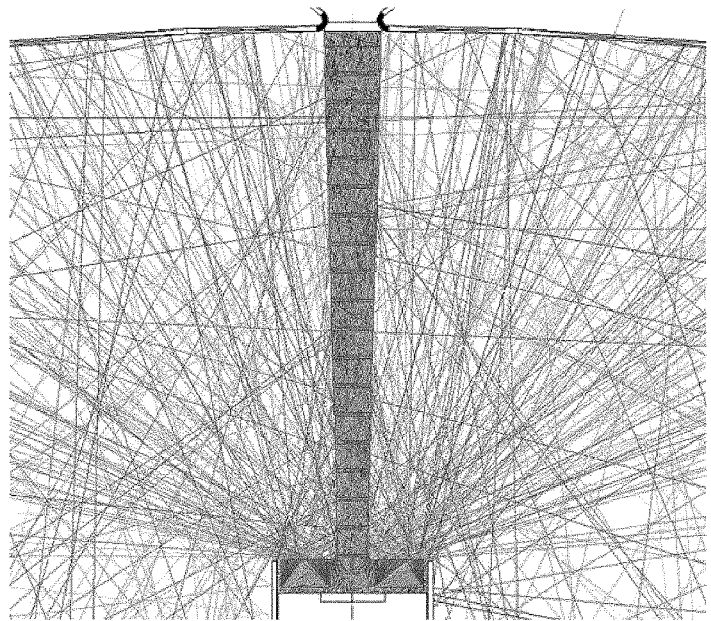
FIG. 29 shows a close-up of the exemplary simulated light ray traces of ray reactions at a central section of the embodiment shown in FIG. 26.

FIGS. 28 and 29 shows exemplary simulated light ray traces of ray reactions of light emitting panel assembly 200. FIG. 28 shows exemplary simulated light ray traces of ray reactions of the entire light emitting panel assembly 200. FIG. 29 shows a close up of exemplary simulated light ray traces of ray reactions of the light emitting panel assembly 200.

This application is intended to cover any variations, uses, or adaptations of the invention using its general principles. Further, this application is intended to cover such departures from the present disclosure as come within known or customary practice in the art to which this invention pertains and which fall within the limits of the appended claims.

Figure 30A:
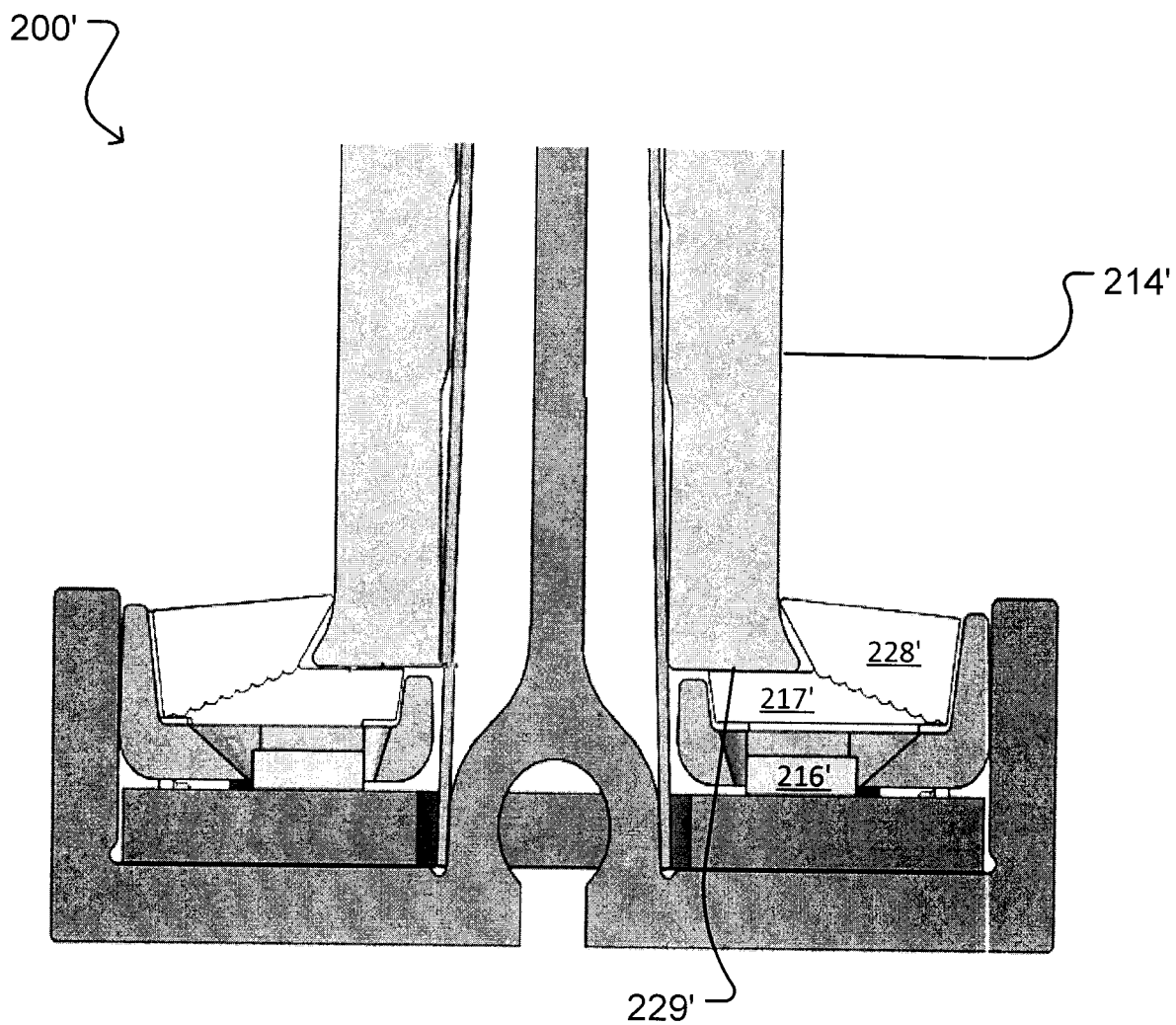
FIG. 30(a) shows a cross-sectional view of a lower section of a light emitting panel assembly according to an example embodiment.
Figure 30B:
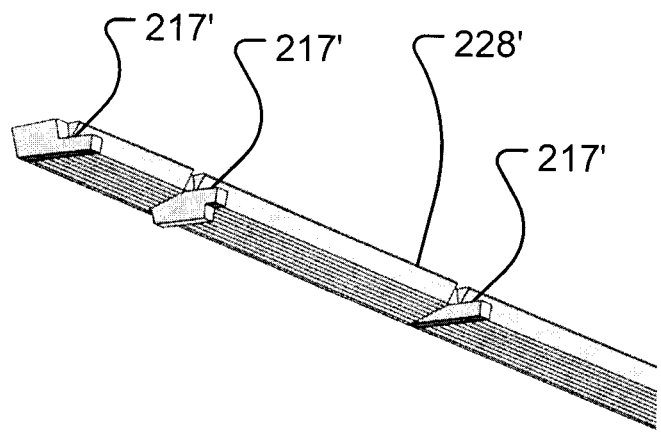
FIG. 30(b) shows a partial isometric view of spacer elements and a lip element of the light emitting panel assembly shown in FIG. 30(a)

As an example of a variation, FIG. 30(a) show the lower section of light emitting panel assembly 200', a variation of light emitting panel assembly 200. Assembly 200' has two light guides 214', each with an array of light sources 216' facing respective lower surfaces 229', spacer elements 217' between individual light sources 216' to space light sources 216' from lower surface 229', and a lip element 228' on each side being a distinct component from light guide 214'. The upper surface and/or lower surface of each lip element 228' may be diffuse for homogenizing light from light source 216' that illuminates the convex reflectors 222' above (not shown). In the embodiment shown, lip elements 228' are injection molded lenses with a textured, i.e., diffuse, lower surface. FIG. 30(b) shows an isolated view of a lip element 228' with spacer elements 217'.

Figure 31:
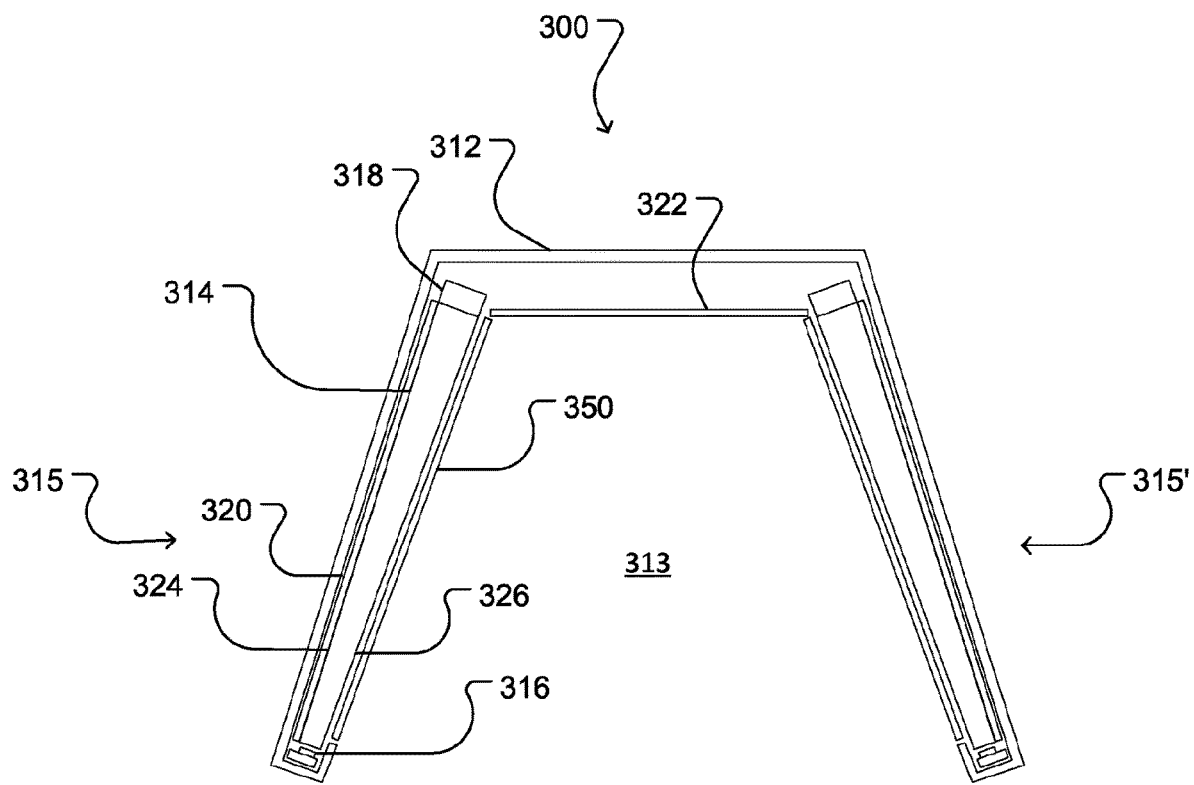
FIG. 31 shows a cross-sectional view of a light emitting panel assembly according to an example embodiment.

As another example of variations, while the light sources, light guides and upper guide reflectors in the embodiments of the light emitting panel assemblies described above are generally aligned vertically, in some embodiments these features may be aligned along an angle other than the vertical for example as shown in FIG. 31.

FIG. 31 shows a light emitting panel assembly 300 according to an embodiment. Light emitting panel assembly 300 has a housing 312 defining an interior cavity 313. A pair of light guides 314 is disposed on the sides of housing 312. Light emitting panel assembly 300 also includes light sources 316, upper guide reflectors 318, side guide reflectors 320, and upper reflector 322.

In contrast to the light guides of assemblies 10, 100 and 200, light guides 314 in assembly 300 are angled off from the vertical. In the embodiment shown in FIG. 30, light guides 314 are angled approximately 20 degrees off from the vertical. In some embodiments, light guides 314 may be angled off from the vertical by up to 20 degrees, 40 degrees, 60 degrees, or 90 degrees (i.e., horizontal).

First major surfaces 324 of light guides 314 comprise extraction elements 330. In some embodiments, extraction elements 330 are similar in structure and function to extraction elements 130 of assembly 100, and therefore only extract light travelling downward in light guide 314, i.e., after being reflected by upper guide reflector 318.

In some embodiments, extraction elements 330 are similar in structure and function to extraction elements 30 of assembly 10, and therefore extract light travelling upward and downward in light guide 314. Extraction elements 330 are configured such that light extracted while travelling upward in light guide 314 is limited to light leaving at an angle high enough to strike the opposing arm 315, 315' and thereby stay within the confines of interior 313. Preventing light travelling upward in the light guide from leaving at a low enough angle to escape interior 313 eliminates the possibility of un-homogenized light (which causes headlamping) from being visible from below assembly 300.

Assembly 300 also has a secondary optic 350 adjacent each second major surface 326 of light guides 314. Secondary optic 350 may, for example, bend light toward the normal, or away from the normal, as required by the application. In some embodiments, secondary optic 350 may be a transflective optic. In some embodiments, secondary optic 350 may be absent.

Figure 32A:
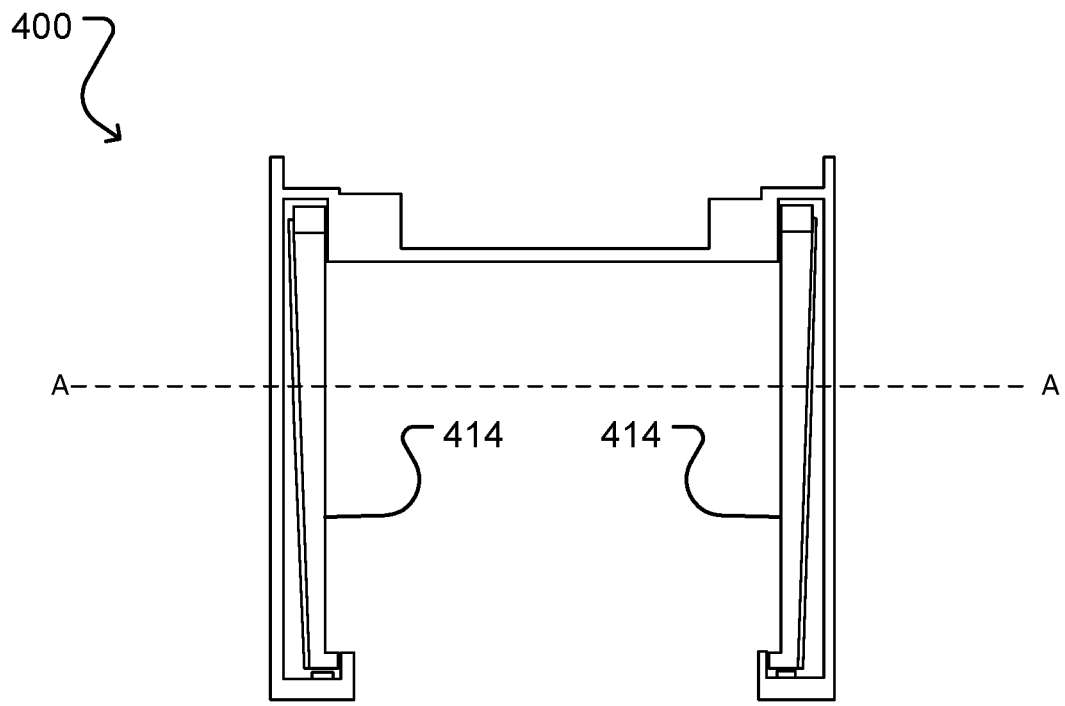
FIG. 32(a) shows a cross-sectional view of a light emitting panel assembly according to an example embodiment.
Figure 32B:
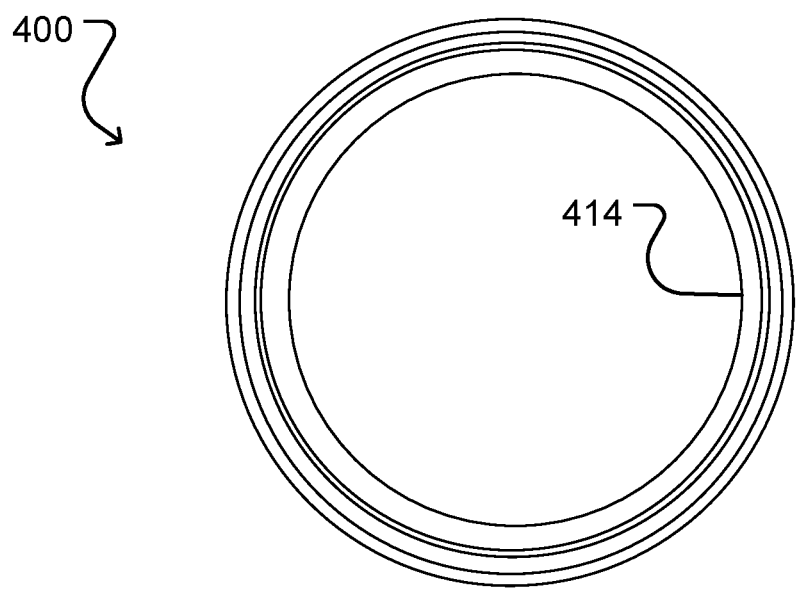
FIG. 32(b) shows a cross-sectional view of the light emitting panel assembly shown in FIG. 32(a) along section A-A.

As a further example of variations, while assemblies such as assemblies 10, 100 and 300 are two-sided and define a cavity therebetween, other configurations are possible. For example, some embodiments may be three-sided (triangular from a top plan view), four-sided (square or rectangular from a top plan view), multi-sided (polygonal from a top plan view), round (circular from a top plan view), oval (oval from a top plan view) and the like, each defining a centrally-located cavity. For example, FIGS. 32(a) and 32(b) show a light emitting panel assembly 400 according to an embodiment similar to light emitting panel assembly 10 but with a hollow cylindrical light guide 414.

Embodiments of the invention include luminaires comprising light emitting panel assemblies 10, 100, 200, 300 and/or 400 and therefore specifically exclude image display devices.

This application is intended to cover any variations, uses, or adaptations of the invention using its general principles. Further, this application is intended to cover such departures from the present disclosure as come within known or customary practice in the art to which this invention pertains and which fall within the limits of the appended claims. Accordingly, the scope of the claims should not be limited by the preferred embodiments set forth in the description, but should be given the broadest interpretation consistent with the description as a whole.

The invention claimed is:

1. A light emitting panel assembly comprising:
a housing;
light guides within the housing;
light sources positioned below a lower surface of each of the light guides;
an upper guide reflector for each of the light guides, whereby light internally reflects through the light guides from the light sources to the upper guide reflectors, each of the upper guide reflectors diffusively reflecting the light back to the light guide to be reflected or refracted by a plurality of extraction elements off or out of a first major surface of each of the light guides or a side guide reflector adjacent to the first major surface of each of the light guides, and subsequently refracted out of a second major surface;
an upper reflector capable of diffusively homogenizing a light exiting a lower lip of each of the light guides extending horizontally towards a cavity defined between the light guides and the light exiting the second major surface of each of the light guides.

2. The light emitting panel assembly according to claim 1 wherein the upper guide reflector is pressed against the upper surface of the light guide.

3. The light emitting panel assembly according to claim 1 wherein the upper guide reflector is laminated or coated to the upper surface of the light guide.

4. The light emitting panel assembly according to claim 1 wherein the upper guide reflector is co-extruded with the upper surface of the light guide.

5. The light emitting panel assembly according to claim 1 wherein a cross section of the upper guide reflector parallel to the first major surface and the second major surface is ridged.

6. The light emitting panel assembly according to claim 1 wherein a cross section of the upper guide reflector parallel to the first major surface and the second major surface is rippled.

7. The light emitting panel assembly according to claim 1, wherein the side guide reflector is semi-specular.

8. The light emitting panel assembly according to claim 1, wherein the side guide reflector is specular.

9. The light emitting panel assembly according to claim 1, wherein the side guide reflector is white.

10. The light emitting panel assembly according to claim 1, wherein the light guide is vertically oriented.

11. The light emitting panel assembly according to claim 1, wherein the light guide is angled away from the vertical.

12. The light emitting panel assembly according to claim 1, wherein the lip comprises a diffusive upper surface for homogenizing light from the light source and directed at the upper reflector.

13. The light emitting panel assembly according to claim 1, wherein the lip comprises a diffusive lower surface for homogenizing light from the light source and directed at the upper reflector.

14. The light emitting panel assembly according to claim 1, wherein the lip comprises diffusive upper and lower surfaces, for homogenizing light from the light source and directed at the upper reflector.

15. The light emitting panel assembly according to claim 1, wherein each of the plurality of extraction elements comprises an upper face and a lower face that define an inwardly extending depression in the first major surface, wherein the lower face is shorter than the upper face, whereby a width of the light guide decreases in a downward direction, wherein an angle of the lower face relative to a plane of the first major surface is less than an angle of the upper face relative to the plane of the first major surface, whereby a width of the light guide decreases in a downward direction.

16. The light emitting panel assembly according to claim 1, wherein a height of the plurality of extraction elements increases in a downward direction, and wherein a distance between each of the plurality of extraction elements decreases in a downward direction.

17. The light emitting panel assembly according to claim 1, wherein each of the plurality of extraction elements are configured such that light extracted while travelling upward in the light guide and the opposing light guide is limited to leaving at an angle high enough to remain within the cavity.

18. The light emitting panel assembly according to claim 1, wherein each of the plurality of extraction elements comprises a step narrowing the light guide and the opposing light guide in the downward direction, whereby only light travelling downward in the light guide or the opposing light guide is extracted from the plurality of extraction elements, wherein a height of the plurality of extraction elements increases in a downward direction, wherein a distance between each of the plurality of extraction elements decreases in a downward direction, and wherein angles of the step relative to a plane of the first major surface increases in a downward direction.

19. The light emitting panel assembly according to claim 1, wherein a width of the upper reflector is at least twice a height of the light guide.

20. The light emitting panel assembly according to claim 1, wherein the lower surface of the light guide and the light source are spaced apart to define a triangular gap wherein an open side of the triangular gap faces the side guide reflector.

21. The light emitting panel assembly according to claim 1, wherein the side guide reflector angles away from the light guide and the opposing light guide in the downward direction at angle of 2 to 15 degrees, wherein the side guide reflector comprises a lower extension extending horizontally toward the light source.

22. A light emitting panel assembly comprising:
a housing;
light guides within the housing;
light sources positioned below a lower surface of each of the light guides;
an upper guide reflector for each of the light guides, whereby light internally reflects through the light guides from the light sources to the upper guide reflectors, each of the upper guide reflectors diffusively reflecting the light back to the light guide to be reflected or refracted by a plurality of extraction elements off or out of a first major surface of each of the light guides or a side guide reflector adjacent to the first major surface of each of the light guides, and subsequently refracted out of a second major surface;
an upper reflector capable of diffusively homogenizing a light exiting a lower lip of each of the light guides extending horizontally towards a cavity defined between the light guides and the light exiting the second major surface of each of the light guides;
wherein the light guides comprise three light guides in a triangular arrangement, two pairs of opposing light guides in a square or rectangular arrangement, or a plurality of pairs of opposing light guides in a polygonal arrangement.

23. A light emitting panel assembly comprising:
a housing;
a cylindrical light guides within the housing and defining a cavity;
light sources positioned below a lower surface of the light guide;
an upper guide reflector for the light guide, whereby light internally reflects through the light guide from the light sources to the upper guide reflector, the upper guide reflector diffusively reflecting the light back to the light guide to be reflected or refracted by a plurality of extraction elements off or out of a first major surface of the light guide or a side guide reflector adjacent to the first major surface of the light guide, and subsequently refracted out of a second major surface;
an upper reflector capable of diffusively homogenizing a light exiting a lower lip of the light guide extending horizontally towards the cavity and the light exiting the second major surface of each of the light guides.

* * * * *